(12) United States Patent
Rusak et al.

(10) Patent No.: US 9,397,912 B2
(45) Date of Patent: Jul. 19, 2016

(54) METHOD AND SYSTEM FOR ACTIVE FABRIC MANAGEMENT USING UNICAST REACHABILITY MONITORING

(71) Applicant: Arista Networks, Inc., Santa Clara, CA (US)

(72) Inventors: Tal Rusak, Santa Clara, CA (US); Kenneth James Duda, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 200 days.

(21) Appl. No.: 13/960,197

(22) Filed: Aug. 6, 2013

(65) Prior Publication Data

US 2014/0269380 A1 Sep. 18, 2014

Related U.S. Application Data

(60) Provisional application No. 61/779,438, filed on Mar. 13, 2013.

(51) Int. Cl.
*H04L 12/26* (2006.01)
*H04L 12/939* (2013.01)

(52) U.S. Cl.
CPC ............ *H04L 43/0811* (2013.01); *H04L 43/10* (2013.01); *H04L 49/555* (2013.01)

(58) Field of Classification Search
CPC ........ H04L 43/12; H04L 43/10; H04L 43/103
See application file for complete search history.

(56) References Cited

U.S. PATENT DOCUMENTS

| 7,496,659 | B1 * | 2/2009 | Coverdill et al. | 709/224 |
|---|---|---|---|---|
| 7,876,690 | B1 * | 1/2011 | Ellis et al. | 370/241 |
| 8,284,665 | B1 * | 10/2012 | Aybay et al. | 370/235 |
| 8,670,326 | B1 * | 3/2014 | Balasubramanian et al. | 370/238 |
| 2005/0002392 | A1 * | 1/2005 | Vijeh et al. | 370/389 |
| 2005/0249157 | A1 * | 11/2005 | Qian et al. | 370/329 |
| 2006/0168276 | A1 * | 7/2006 | Black et al. | 709/230 |
| 2006/0285500 | A1 * | 12/2006 | Booth et al. | 370/250 |
| 2010/0027436 | A1 * | 2/2010 | Yamasaki | 370/252 |
| 2010/0034098 | A1 * | 2/2010 | Wang et al. | 370/242 |
| 2012/0106339 | A1 * | 5/2012 | Mishra et al. | 370/235 |
| 2012/0120801 | A1 * | 5/2012 | Ramakrishnan et al. | 370/235 |
| 2012/0218893 | A1 * | 8/2012 | Natarajan et al. | 370/235 |
| 2013/0124607 | A1 * | 5/2013 | Griffith et al. | 709/203 |

(Continued)

OTHER PUBLICATIONS

Viswanathan, A., Krishnamurthy, S., Manur, R., and Zinjuvadia, V; Traceflow; Force10 Networks; Aug. 16, 2008 (38 pages).

*Primary Examiner* — Anh-Vu Ly
*Assistant Examiner* — Hector Reyes Ortiz
(74) *Attorney, Agent, or Firm* — Osha Liang LLP

(57) ABSTRACT

A method for active network fabric management. The method includes receiving a probe packet by a termination beacon, where the probe packet is associated with a stream, the stream is identified using an origin beacon identification (ID) for an origin beacon, a stream source IP address, a stream destination IP address, an L2 origin interface, and a TTL value or an IP Hop value. The method further includes generating, after receiving the probe packet and after the expiration of a probe rate request (PRR) refresh timer, a rate control packet (RCP) by the termination beacon where the RCP includes a PRR for the stream, and sending the RCP to the origin beacon using an origin beacon IP address, where the origin beacon IP address is different than the stream source IP address.

21 Claims, 15 Drawing Sheets

(56) References Cited

U.S. PATENT DOCUMENTS

2013/0136002 A1* 5/2013 Song et al. .................... 370/235
2013/0246641 A1* 9/2013 Vimpari et al. ............... 709/228
2013/0286833 A1* 10/2013 Torres et al. .................. 370/235
2015/0043366 A1* 2/2015 Kneckt et al. ................. 370/252

* cited by examiner

| Probe Rate Request 324 |
|---|
| Origin Beacon ID 326 |
| Stream Source IP Address 328 |
| Stream Destination IP Address 330 |
| Origin IP Address 332 |
| L4 Source Port 334 |
| L4 Destination Port 335 |
| L2 Origin Interface 336 |
| Source MAC Address 338 |
| Destination MAC Address 340 |
| VLAN Tag 342 |
| IP hops 344 |
| L4 Protocol 346 |
| Requested Probe Rate (RPR) 348 |

FIG. 3B

METHOD AND SYSTEM FOR ACTIVE FABRIC MANAGEMENT USING UNICAST REACHABILITY MONITORING

CROSS-REFERENCE TO RELATED APPLICATIONS

Pursuant to 35 U.S.C. §119 (e), this application claims benefit of U.S. Provisional Application No. 61/779,438 filed on Mar. 13, 2013, entitled "Method and System for Active Fabric Management Using Unicast Forward Monitoring." The disclosure of the U.S. Provisional Application is incorporated herein by reference in its entirety.

BACKGROUND

Network administrators are tasked with ensuring that network infrastructure is operating properly. As network infrastructures have become more complex, this task has become increasing more difficult. In particular, attempting to troubleshoot complex network infrastructure using traditional troubleshooting tools (e.g., ping or trace route) is a difficult and time consuming task. For example, test packets sent by traditional trouble shooting tools may take specific paths through the network and such tools may not cover all available network paths.

SUMMARY

In general, in one aspect, the invention relates to a non-transitory computer readable medium comprising instructions, which when executed by a processor perform a method, the method comprising receiving a probe packet by a termination beacon, where the probe packet is associated with a stream, where the stream is identified using an origin beacon identification (ID) for an origin beacon, a stream source IP address, a stream destination IP address, an L2 origin interface and one selected from a group consisting of an IP hops value and a time to live (TTL) value, generating, after receiving the probe packet and after the expiration of a probe rate request (PRR) refresh timer, a rate control packet (RCP) by the termination beacon where the RCP comprises a PRR for the stream, and sending the RCP to the origin beacon using an origin beacon IP address, where the origin beacon IP address is different than the stream source IP address.

In general, in one aspect, the invention relates to a non-transitory computer readable medium comprising instructions, which when executed by a processor perform a method, the method comprising generating a probe packet for a stream specified in an egress stream table (EST) in an origin beacon, where the stream is identified using an origin beacon identification (ID), a stream source IP address, a stream destination IP address, an L2 origin interface, and one selected from a group consisting of an IP hops value and a time to live (TTL) value, transmitting the probe packet from the origin beacon to a termination beacon, where the probe packet is transmitted using the L2 origin interface, and receiving, a rate control packet (RCP) from the termination beacon, where the RCP comprises a packet rate request (PRR) for the stream, where the RCP only includes the PRR for the stream when the termination beacon receives the probe packet for the stream.

Other aspects of the invention will be apparent from the following description and the appended claims.

BRIEF DESCRIPTION OF DRAWINGS

FIG. 3B shows a probe rate request in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-14, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to using probe packets and rate control packets to monitor a network to discover network instability, link failure (consistent or intermittent), configuration issues, software or hardware issues in network devices in the network, or any combination thereof.

Figure 1:
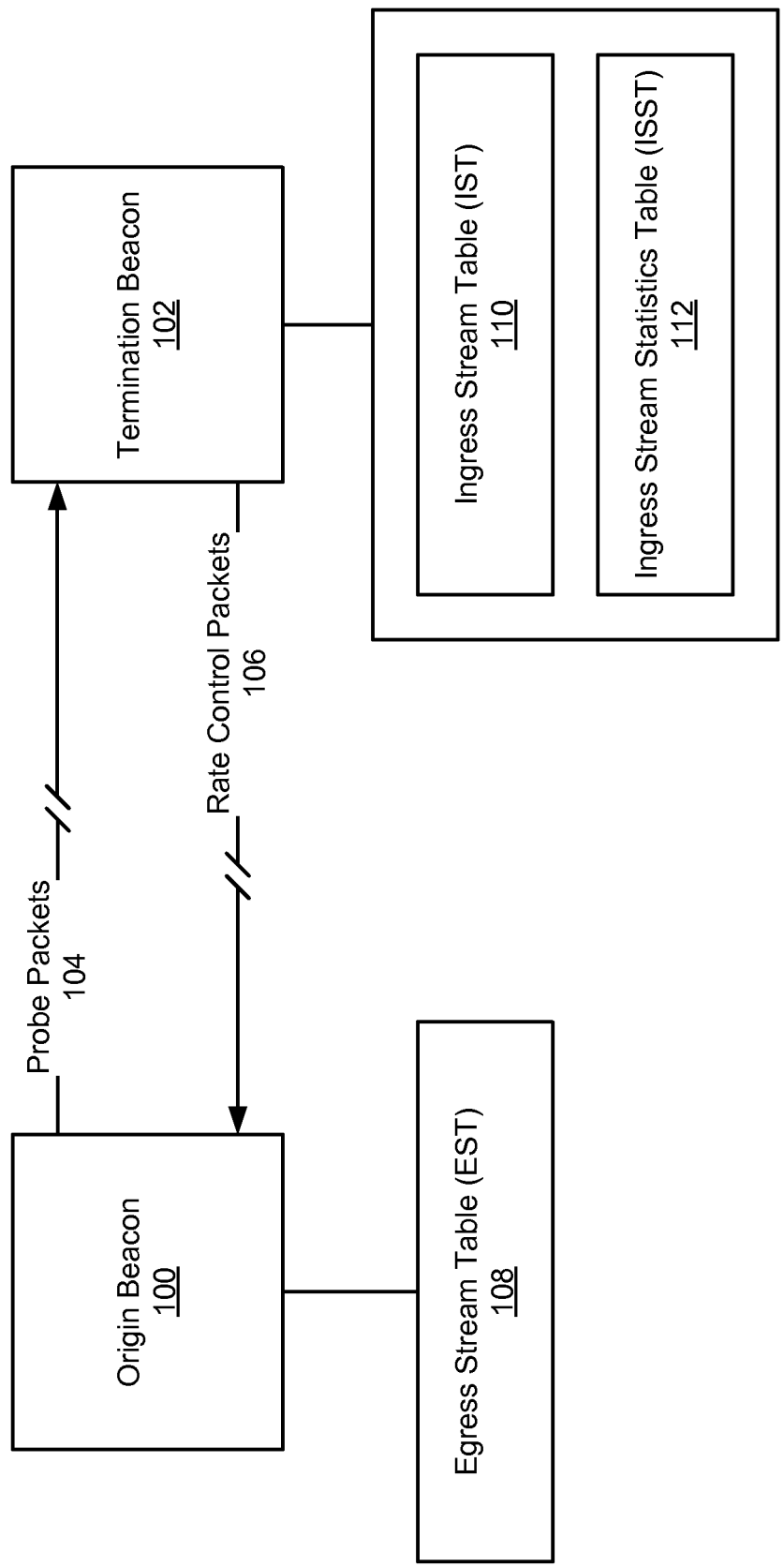
FIG. 1 shows the interaction of beacons in accordance with one or more embodiments of the invention.

FIG. 1 shows an interaction of beacons in accordance with one or more embodiments of the invention. The system includes at least two beacons—an origin beacon (100) and a termination beacon (102). Each origin beacon is configured to generate and transmit probe packets to one or more termination beacons. Each of the termination beacons (102) includes functionality to receive probe packets (104) and, as appropriate, generate rate control packets (RCP) (106). In one or more embodiments of the invention, each beacon (i.e., origin beacons and termination beacons) may be implemented on a network device. Examples of networks devices that may implement a beacon include, but are not limited to, switches, routers, and servers. In addition, beacons may also be implemented on, for example, desktops, host, and mobile devices. The network may include other network devices (e.g., a router) that may not include functionality to implement an origin beacon or a termination beacon. In one embodiment of the invention, a single network device may act as (or have executing thereon) both an origin beacon and a termination beacon.

When implementing an origin beacon, the network device includes functionality to maintain an egress stream table (108) (see e.g., FIG. 4) and to implement the functionality shown in FIGS. 7, 9, and 10A-10B. When implementing a termination beacon, the network device includes functionality to optionally maintain an ingress stream table (110) (see e.g., FIG. 6) and an ingress stream statistics table (112) (see e.g., FIG. 5) and to implement the functionality shown in FIGS. 8, 11 and 13. Origin beacons and termination beacons may be implemented in software, hardware, or any combination thereof without departing from the invention.

In one embodiment of the invention, each termination beacon includes (or may otherwise access) an ISST (112). However, the termination beacon may only include an IST (110) if the termination beacon generates at least one RCP for at least one origin beacon. In one embodiment of the invention, termination beacon corresponds to the beacon that traps the probe packet when (i) the TTL in the probe packet expires or (ii) the IP address of the termination beacon matches the stream destination IP address (see 208 in FIG. 2).

In one embodiment of the invention, a server is any type of physical system that includes persistent storage, memory (e.g., Random Access Memory), one or more processors, and one or more network interfaces that are configured to send and receive packets (including, as appropriate, probe packets and/or rate control packets). One or more of the network interfaces may not be connected or be connected to other network devices. In one embodiment of the invention, the persistent storage in the server may include any non-transitory computer readable medium that includes instructions, which when executed by one or more processors in the server, enable the server to perform the functions described in accordance with one or more embodiments of the invention (see e.g., FIGS. 7-13).

In one embodiment of the invention, a switch is a physical device that includes persistent storage, memory (e.g., Random Access Memory), one or more processors, and two or more physical ports. Each port may or may not be connected to another a network device (e.g., a server, a switch, a router, etc.). Each switch is configured to receive packets via the ports and determine whether to (i) drop the packet, (ii) process the packet in accordance with one or more embodiments of the invention, or (iii) send the packet out over another one of the ports on the switch. How the switch makes the determination of whether to drop or send the packet to another switch depends on whether the switch is a layer-2 (L2) switch or a layer-3 (L3) switch (also referred to as multilayer switch). If the switch is operating as a L2 switch, the switch uses the destination media access control (MAC) address in the received packet along with a forwarding table to determine out of which port to send the packet. If the switch is operating as a L3 switch, the switch uses the destination internet protocol (IP) address in the received packet along with a routing table to determine out of which port to send the packet.

In one embodiment of the invention, the persistent storage in the switch may include any non-transitory computer readable medium that includes instructions, which when executed by one or more processors in the switch, enable the switch to perform the functions described in accordance with one or more embodiments of the invention (see e.g., FIGS. 7-12).

In one or more embodiments of the invention, a network device implementing an origin beacon (100) may be directly connected to a network device that is termination beacon (102), which is the intended recipient of at least one probe packet from the origin beacon. Alternatively, the aforementioned network devices may be separated by one or more intermediate network devices. The number of intermediate network devices between a network device implementing the origin beacon and a network device implementing the termination beacon is determined by the design of the network. The intermediate network devices forward probe packets and, optionally, rate control packets in the same manner as any other packet transmitted on the network. Said another way, the probe packets and, if present, the rate control packets are processed by the network devices in the same manner as any other packet with the same packet headers that are utilized by the network device(s) for packet forwarding. (See e.g., FIG. 14).

The invention is not limited to the system shown in FIG. 1.

Figure 2:
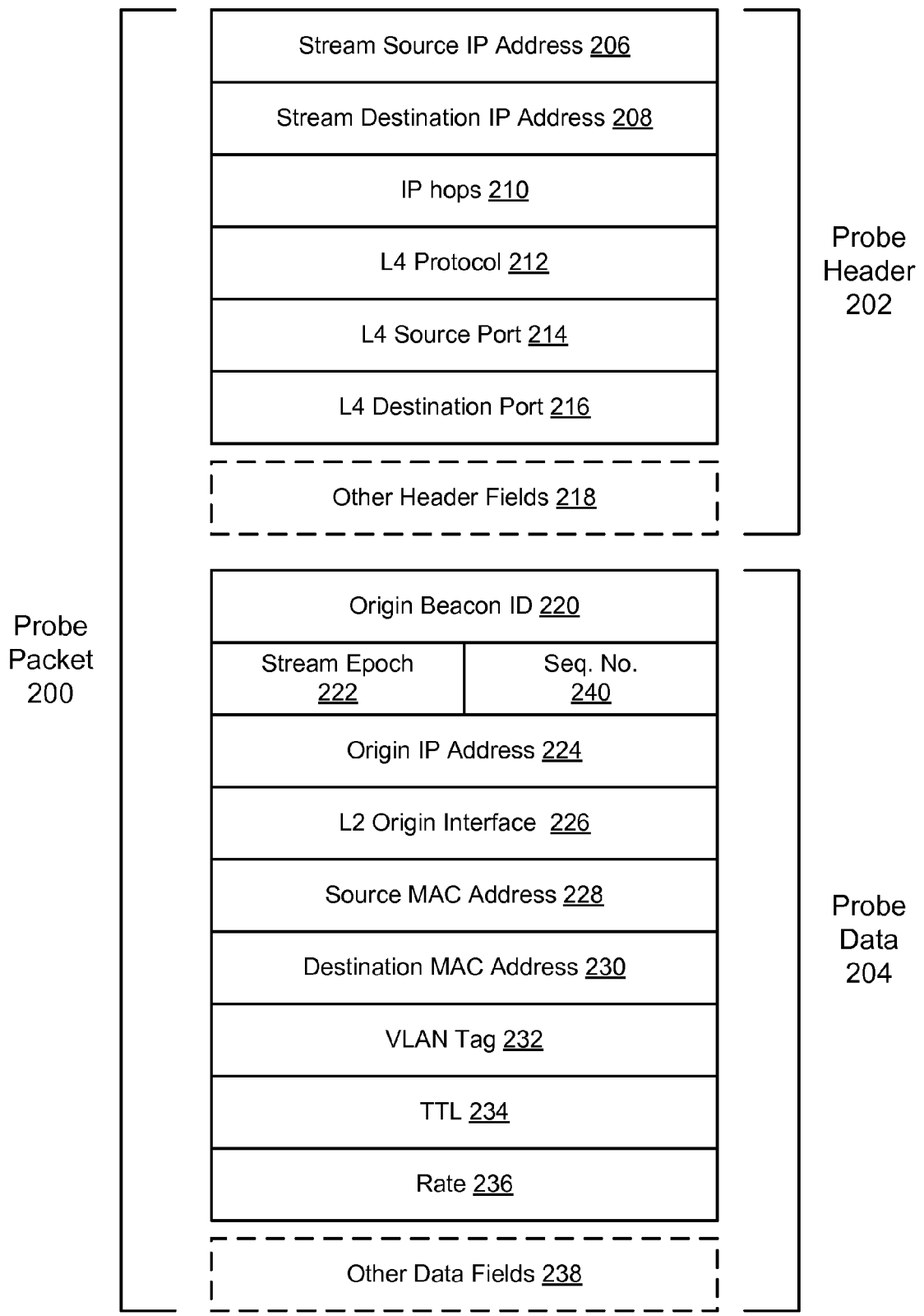
FIG. 2 shows a probe packet in accordance with one or more embodiments of the invention.

FIG. 2 shows a probe packet in accordance with one or more embodiments of the invention. Each probe packet (200) is a unicast packet that is associated with a particular stream. A stream is used to generate and route probe packets. More specifically, each stream is a unique combination of <origin beacon ID (typically an IP address), stream source IP address, stream destination IP address, IP Hop value (or TTL value for IPv4), L4 source port, L2 origin interface> that is used to generate and route probe packet from the origin beacon to the termination beacon (identified by the destination IP address and/or IP Hop value and/or TTL value). The aforementioned unique combination may optionally include the L4 destination port. The probe packets may be generated using additional or different information shown in FIG. 2 without departing from the invention. Further, the aforementioned information only corresponds to a portion of the information that is included in the probe packet (in either the probe header or probe data) (see FIG. 2). In one embodiment of the invention, the probe packet may include a stream ID, which may be used to obtain the information shown in FIG. 2 from the origin beacon. In such embodiments, the probe packets may include less information than shown in FIG. 2. Continuing with the discussion of FIG. 2, each stream is generated in order to determine the operation of a particular part of (or path in) the network. More specifically, each of the streams is generated in order to understand how packets with a particular source IP address and L4 source port combination (or streams with other characteristics) are routed through the network to a particular destination IP address, where the source IP address may or may not be associated with an L3 interface (virtual or physical) on the origin beacon. (See e.g., FIG. 14). In one embodiment of the invention, the path that a given probe packet takes from the origin beacon to the particular destination IP address is determined using the information in the probe packet in combination with equal-cost multi-path routing (ECMP) and/or Link Aggregation Groups (LAG) in the network. For example, using ECMP and LAGs, probe packets with the same destination IP address but different source IP addresses and/or L4 source ports may take different paths through the network to reach the termination beacon with the destination IP address.

The probe packet (200) includes a probe header (202) and probe data (204). The probe header includes the necessary information to transmit the probe packet from the origin beacon to a termination beacon. The probe data (204) includes information about the origin beacon and the probe packet that is used by the termination beacon to track the origin of the probe packet and other information related to transmission of the probe packet (see e.g., FIGS. 11 and 13).

The probe header (202) includes one or more of the following fields: (i) stream source Internet Protocol (IP) address (206)—specifying an IPv4 or an IPv6 address of the stream which may be different than the origin IP address (described below); (ii) stream destination IP address (208)—specifying an IP address that may or may not correspond to the termination beacon; (iii) IP hops (210) (or TTL for IPv4)—specifying the number of hops (typically between 1 and 255) the probe packet may traverse in the network between the origin beacon and the termination beacon; (iv) L4 protocol (212)—specifying the L4 protocol (e.g., transmission control protocol (TCP) or user datagram protocol (UDP)) used by the probe packet; (v) L4 source port (214)—typically specifying the TCP or UDP source port of the stream; (vi) L4 destination port (216)—typically specifying a default TCP or UDP destination port that is used by all termination beacons in the network for receiving probe packets; (vii) other header fields (218) specifying additional information required for the routing of the probe packet (e.g., SYN FLAG=1 when L4 protocol is TCP).

The probe data (204) includes one or more of the following fields: (i) origin beacon identifier (ID) (220)—specifying an identifier of the origin beacon, which may be, for example, a loopback address that may be used to route packets to the origin beacon but that is not assigned to any particular L3 interface on the network device on which the origin beacon is executing; (ii) stream epoch (222)—specifying a time the stream was created (or the version of the stream); (iii) sequence number (240)—specifying the sequence number of the probe packet in relation to other probe packets within the stream; (iv) origin IP address (224)—specifying an IP address of the L3 interface on the origin beacon that was used to issue the probe packet, which may be different than the stream source IP address; (v) L2 origin interface (226)—specifying the physical interface or port on the network device on which the origin beacon is executing out of which the probe packet was transmitted; (vi) source media access control (MAC) address (228)—specifying the MAC address associated with the L2 origin interface; (vii) destination media access control (MAC) address (230)—specifying the MAC address associated with the destination IP address on the termination beacon; (viii) virtual local area network (VLAN) tag (232)—specifying VLAN over which the probe packet is associated; (ix) IP Hop (234) value—specifying the same value as the IP Hop value in the probe header (202) (but not decremented as probe packet is forwarded through the network), where the IP hop (234) value is maintained for analysis of the probe packet; (xii) rate (236)—specifying the interval at which probe packets for the stream are being generated; (xiii) other data fields (238)—specifying other information about the stream and/or probe packet, e.g., message type, version of the field layout in the probe data, and checksum of the probe data.

The invention is not limited to the probe packet shown in FIG. 2. Further, the order of the fields included in the probe packet may be modified without departing from the invention.

Figure 3A:
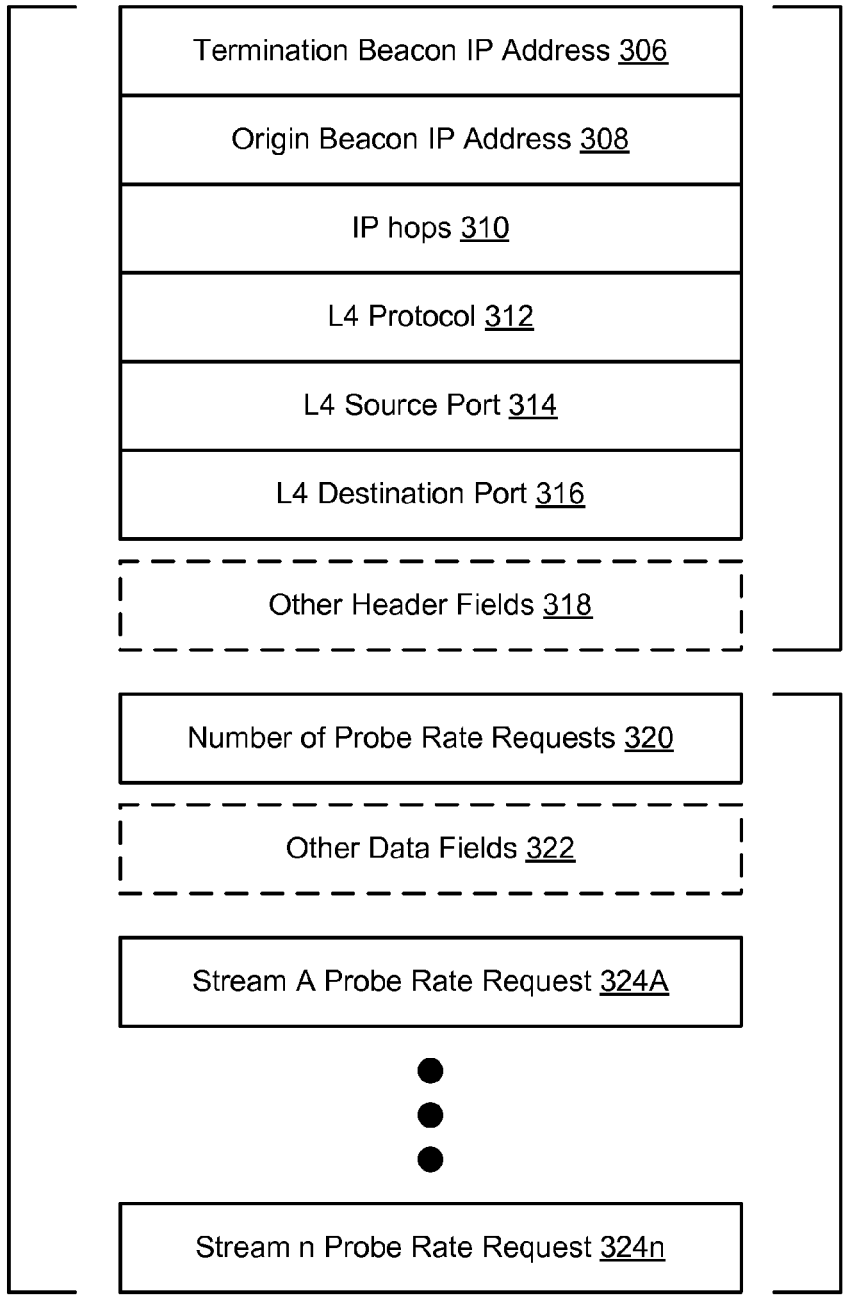
FIG. 3A shows a rate control packet in accordance with one or more embodiments of the invention.

FIG. 3A shows a rate control packet in accordance with one or more embodiments of the invention. Each rate control packet (RCP) (300) is generated by a termination beacon for a particular origin beacon and includes stream probe rate requests (also referred to a probe rate requests (PRRs)) for one or more streams maintained by the origin beacon. The RCP only includes PRRs for streams for which at least one probe packet was received by the termination beacon. If no probe packets were received or have not been received within a certain time period for a stream, then the RCP may not include PRRs for the corresponding stream. When an origin beacon receives an RCP that includes a particular PRR for a stream, the origin beacon may view the PRR as confirmation that at least one of the probe packets it transmitted to the termination beacon for the particular stream was received by the termination beacon. When an origin beacon receives an RCP that does not include a particular PRR for a stream, the origin beacon may view the lack of PRR as a confirmation that none of the probe packets sent (or sent within a particular time period) was received by the termination beacon. Further, if no RCP packet is received from the termination beacon, then the origin beacon may infer that none of the probe packets reached (or were otherwise processed) by the termination beacon.

Turning to the RCP (300) in FIG. 3A, the RCP includes a header (302) that is used to route the RCP to the appropriate origin beacon (using an origin beacon IP address (308)) and RCP data (304) that includes, among other data, the PRRs.

The RCP header (302) includes one or more of the following fields: (i) termination beacon IP address (306)—specifying the IP address of the termination beacon that generated and transmitted the RCP; (ii) origin beacon IP address—specifying the IP address of the origin beacon for which the RCP is destined; (iii) IP hops (310)—specifying the number of hops (typically between 1 and 255) the RCP may traverse in the network between the origin beacon and the termination beacon (typically set to a default value); (iv) L4 protocol (312)—specifying the L4 protocol (typically user datagram protocol (UDP)) used by the RCP; (v) L4 source port (314)—typically specifying the TCP source port of the RCP (typically randomly selected); (vi) L4 destination port (316)—typically specifying a default TCP destination port that is used by all origin beacons in the network for receiving RCPs; (vii) other header fields (318)—specifying other information that may be required to route the RCP to the origin beacon.

The RCP data (304) may include one or more of the following fields: (i) number of probe rate requests (320)—specifying the number of PRRs in the RCP; (ii) other data fields (322)—specifying other information about the stream and/or RCP (e.g., message type, version of the field layout in the RCP data, and checksum of the RCP data); (iii) one or more PRRs (324A, 324n) as specified by field (i) in the RCP data.

FIG. 3B shows a stream probe rate request or PRR in accordance with one or more embodiments of the invention. As discussed above, each PRR is associated with a particular stream. The fields in the PRR are used to identify the stream and to covey the requested probe rate for the stream.

Each PRR (324) includes one or more of the following fields: (i) origin beacon identifier (ID) (326)—specifying an identifier of the origin beacon, which may be, for example, a loopback address that may be used to route packets to the origin beacon but that is not assigned to any particular L3 interface on the network device on which the origin beacon is executing; (ii) stream source Internet Protocol (IP) address (328)—specifying an IP address of the stream which may be different than the origin IP address; (iii) stream destination IP address (330)—specifying an IP address that may or may not correspond to the termination beacon; (iv) origin IP address (332)—specifying an IP address of the L3 interface on the origin beacon that was used to issue the probe packet, which may be different than the stream source IP address; (v) L4 source port (334)—specifying the L4 source port of the stream; (vi) L4 destination port (335) specifying the L4 destination port of the stream; (vii) L2 origin interface (336)—specifying the physical interface or port on the network device on which the origin beacon is executing out of which the probe packet was transmitted; (viii) source media access control (MAC) address (338)—specifying the MAC address associated L2 origin interface on which probes for the stream were transmitted; (ix) destination media access control (MAC) address (340)—specifying the MAC address associated with the destination IP address that was included in the probe packets for the stream; (x) virtual local area network (VLAN) tag (342)—specifying VLAN over which the probe packets for the steam are associated; (xi) IP hops (344) value—specifying the same value as the IP hops in the probe packets for the stream; (xii) L4 protocol (346)—specifying the L4 protocol (e.g., transmission control protocol (TCP) or user datagram protocol (UDP)) used by the probe packet; (xiii) requested probe rate (RPR) (348) the maximum rate at which the termination beacon would like to receive packets from the origin beacon for the particular stream. In one embodiment of the invention, the RCP may include a stream ID, which may be used to obtain the information shown in FIGS. 3A and 3B from the termination beacon. In such embodiments, the RCPs may include less information than shown in FIGS. 3A and 3B.

The invention is not limited to the RCP shown in FIGS. 3A and 3B. Further, the order of the fields included in the RCP may be modified without departing from the invention.

Figure 4:
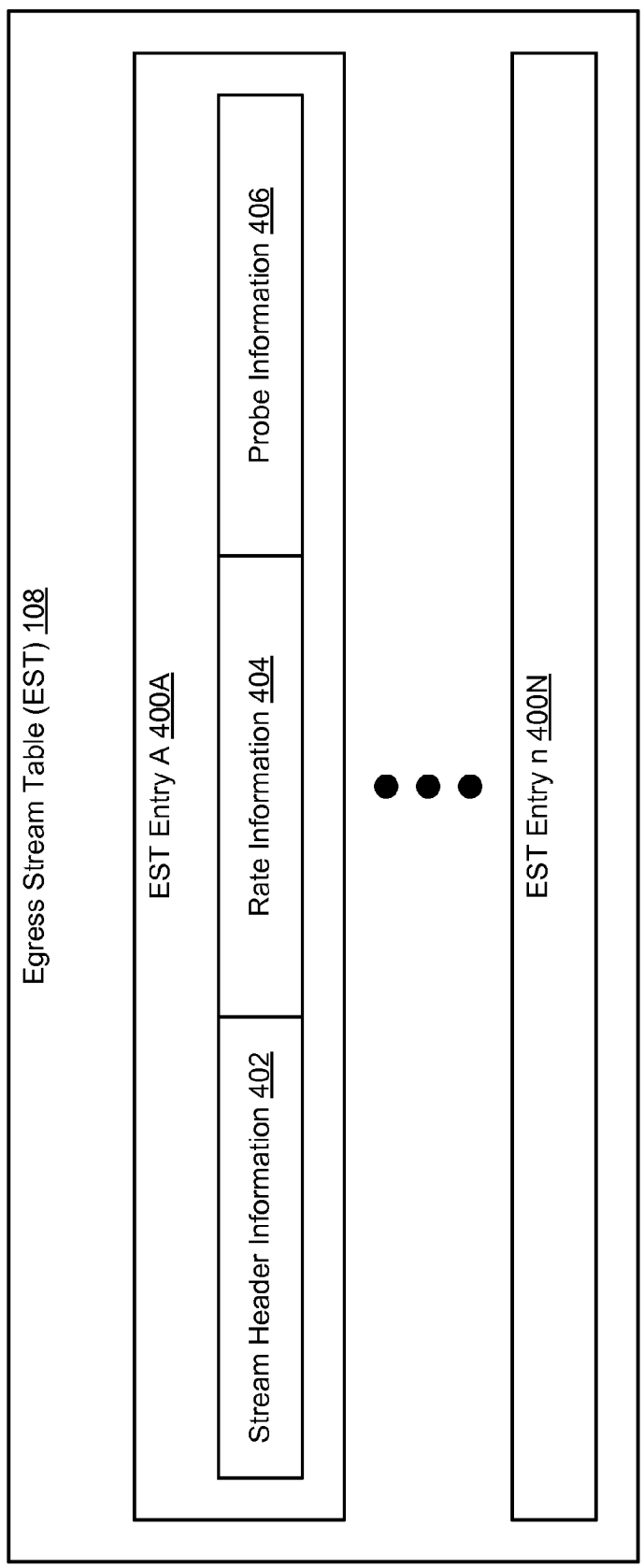
FIG. 4 shows an egress stream table (EST) in accordance with one or more embodiments of the invention.

FIG. 4 shows an egress stream table (EST) in accordance with one or more embodiments of the invention.

The EST (108) includes one or more EST entries (400A, 400N). Each EST entry is associated with one stream. More specifically, there is a 1:1 mapping between EST entries and streams generated by the origin beacon. Each EST entry includes stream header information (402), rate information (404), and probe information (406). The stream header information (402) may act as a key for a given EST entry.

The stream header information (402) may include, but is not limited, to: (i) origin beacon ID, (ii) stream source IP address; (iii) stream destination IP address; (iv) L4 source port; (v) L4 Destination port, (vi) IP TLL (or IP Hops); (vii) Origin IP address; (viii) L4 protocol; (ix) L2 origin interface; (x) source MAC address; (xi) destination MAC address; (xii) VLAN tag. The aforementioned information may be obtained from one or more probe packets for the stream, during the creation of a stream (see FIG. 7), from another information source, or any combination thereof.

The rate information (404) may include, but is not limited to: (i) forced rate (as specified by administrator (or other user); (ii) last RPR received via an RCP from a termination beacon; and (iii) actual rate at which probe packets are being sent (see FIG. 10B). The probe information may include, but is not limited to, (i) cache probe packet (i.e., probe header and data fields for the last probe packet that was transmitted for the stream); (ii) the last sequence number used by the a probe packet in the stream; (iii) the stream epoch for the stream on which probe packets are currently being transmitted.

The EST may be implemented using any known data structure(s) without departing from the invention.

Figure 5:
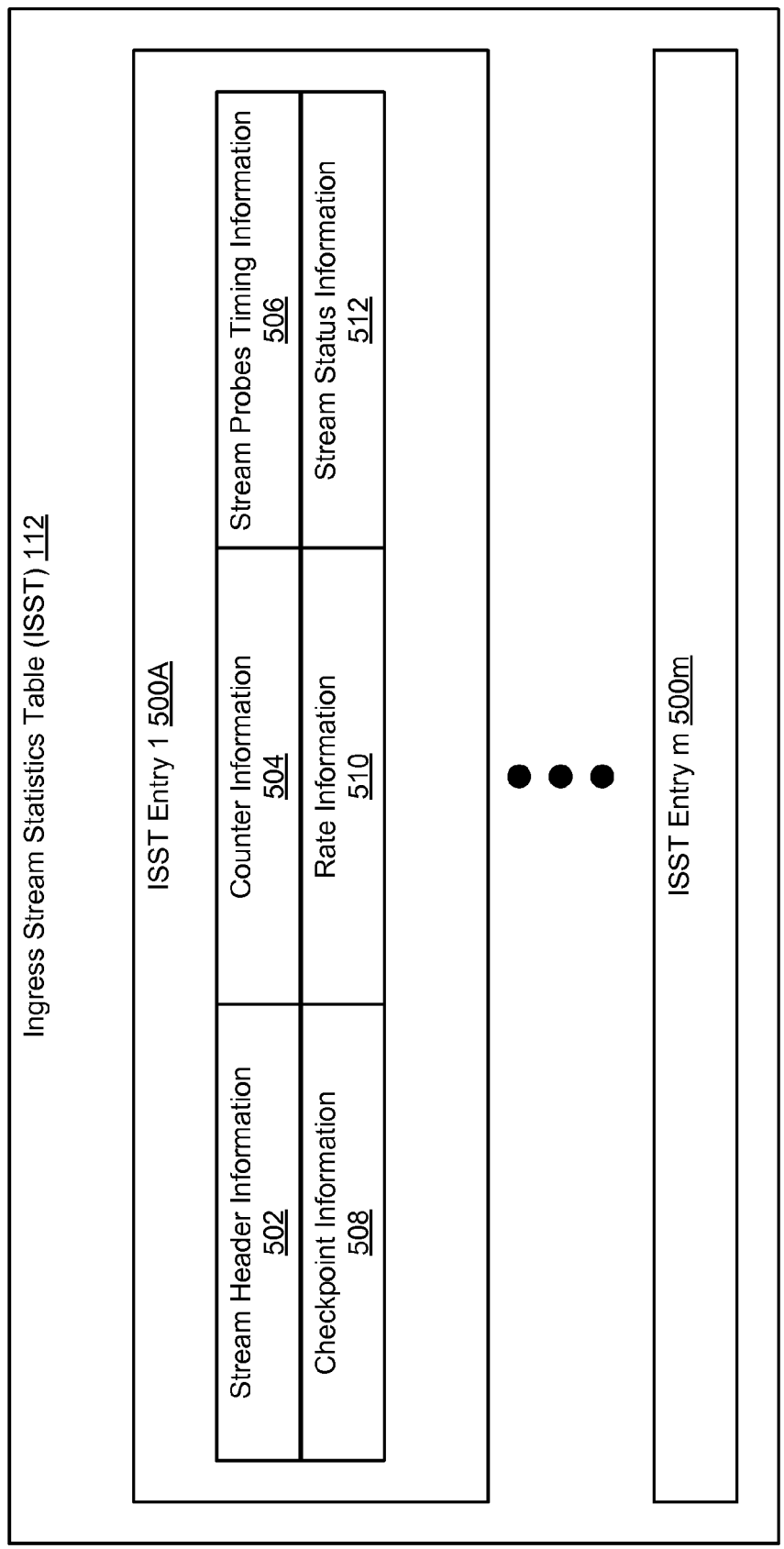
FIG. 5 shows an ingress stream statistics table (ISST) in accordance with one or more embodiments of the invention.

FIG. 5 shows an ingress stream statistics table (ISST) in accordance with one or more embodiments of the invention. The ISST (112) includes one or more EST entries (500A, 500m). Each ISST entry is associated with one stream. More specifically, there is a 1:1 mapping between ISST entries and ingress streams. Each ISST entry includes stream header information (502), counter information (504), stream probe timing information (506), checkpoint information (508), rate information (510), and stream status information (512). The stream header information (502) may act as a key for a given ISST entry.

In one embodiment of the invention, the stream header information (502) may include, but is not limited to, (i) origin beacon ID, (ii) stream source IP address; (iii) stream destination IP address; (iv) L4 source port; (v) IP TLL (or IP Hops); (vi) Origin IP address; (vii) L4 protocol; (viii) L2 origin interface; (ix) source MAC address; (x) destination MAC address; (xi) VLAN tag; (xii) L2 ingress interface, which specifies the port or network interface on which the probe packet for the stream (specified by the other components of the stream header information) was received. Optionally, the stream header information (502) may include the L4 destination port. The aforementioned information may be obtained from one or more probe packets for the stream as they are received by the termination beacon.

In one embodiment of the invention, the counter information (504) may include, but is not limited to, (i) the number of probe packets received from the stream, (ii) the number of probe packets that were lost, which may be determined based on gaps in the sequence numbers of the received probe packets, (iii) probe misordering information based on a lower sequence number coming after a higher one, and (iv) an initial probe sequence number and a bit set including information about the subsequent probes that were either received (1 in the bit set) or lost (0), determined based on sequence number gaps. In one embodiment of the invention, the bit set may be reset when the number of bits is exceeded, or it may "wrap" and include information about the most recent probe reception. The counters may also include details about latency of probe packets in the various streams. The aforementioned latency may be expressed, for example, as average latency, latest latency, or the latency of each individual probe packet. Latency may be expressed using other metrics without departing from the invention.

In one embodiment of the invention, the stream probes timing information (506) may include, but is not limited to, (i) the time the last probe packet for the stream was received; (ii) the time when the last probe packet was lost (which may be determined using the sequence numbers in the received probe packets and the rate at which probe packets are being sent by the origin beacon); (iii) the time when the last probe packet was misordered (which may be determined using the sequence numbers in the probe packets).

In one embodiment of the invention, the checkpoint information (508) may include, but is not limited to, information for at least two checkpoint times. For each checkpoint time, the checkpoint information (508) includes the counter information at the checkpoint time and the stream probes timing information at the checkpoint time. In one embodiment of the invention, the rate information (510) may include, but is not limited to, the rate at which probe packets for the stream are expected to arrive at the termination beacon, which is specified in the probe packets for the stream. In one embodiment of the invention, the stream status information (512) may include, but is not limited to, (i) the sequence number that was received in the last probe packet received for the stream and (ii) whether the stream is dormant (see FIG. 11).

The ISST may be implemented using any known data structure(s) without departing from the invention.

Figure 6:
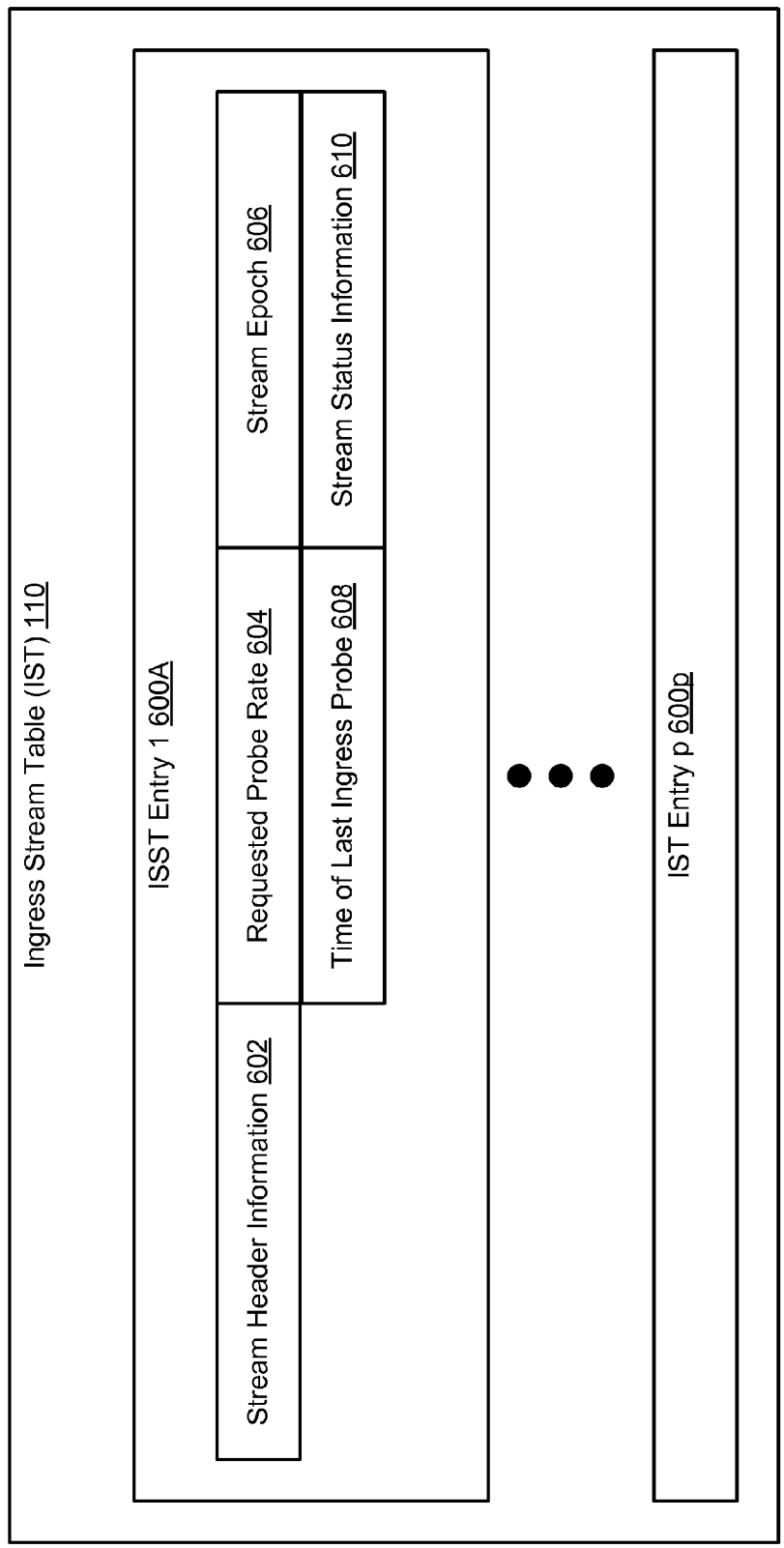
FIG. 6 shows an ingress stream table (IST) in accordance with one or more embodiments of the invention.

FIG. 6 shows an ingress stream table (IST) in accordance with one or more embodiments of the invention.

The IST (110) includes one or more IST entries (600A, 600p). Each IST entry is associated with one ingress stream. More specifically, there is a 1:1 mapping between IST entries and ingress streams. Each IST entry includes stream header information (602), requested probe rate (604), stream epoch (606), time of last ingress probe (608), and stream status information (610). The stream header information (602) may act as a key for a given IST entry.

In one embodiment of the invention, the stream header information (602) may include but is not limited to, (i) origin beacon ID, (ii) stream source IP address; (iii) stream destination IP address; (iv) L4 source port; (v) IP TLL (or IP Hops); (vi) Origin IP address; (vii) L4 protocol; (viii) L2 origin interface; (ix) source MAC address; (x) destination MAC address; (xi) VLAN tag; (xii) L2 ingress interface, which specifies the port or network interface on which the probe packet for the stream (specified by the other components of the stream header information) was received. Optionally, the stream header information (502) may include the L4 destination port. The aforementioned information may be obtained from one or more probe packets for the stream as they are received by the termination beacon.

In one embodiment of the invention, the requested probe rate (604) corresponds to the rate at which the termination beacon would like to receive probe packets for the stream. The requested probe rate may be computed locally by the termination beacon. In one embodiment of the invention, the stream epoch (606) specifies the stream epoch specified in the most recent probe packet received on the stream. In one embodiment of the invention, the time of last ingress probe (608) specifies when the most recent probe packet for the stream was received by the termination beacon. In one embodiment of the invention, the stream status information (610) specifies whether the stream is stale (see FIG. 11).

The IST may be implemented using any known data structure(s) without departing from the invention.

FIGS. 7-11 and 13 show flowcharts in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIGS. 7-11 and 12 may be performed in parallel with any other steps shown in FIGS. 3A-3B without departing from the invention.

Figure 7:
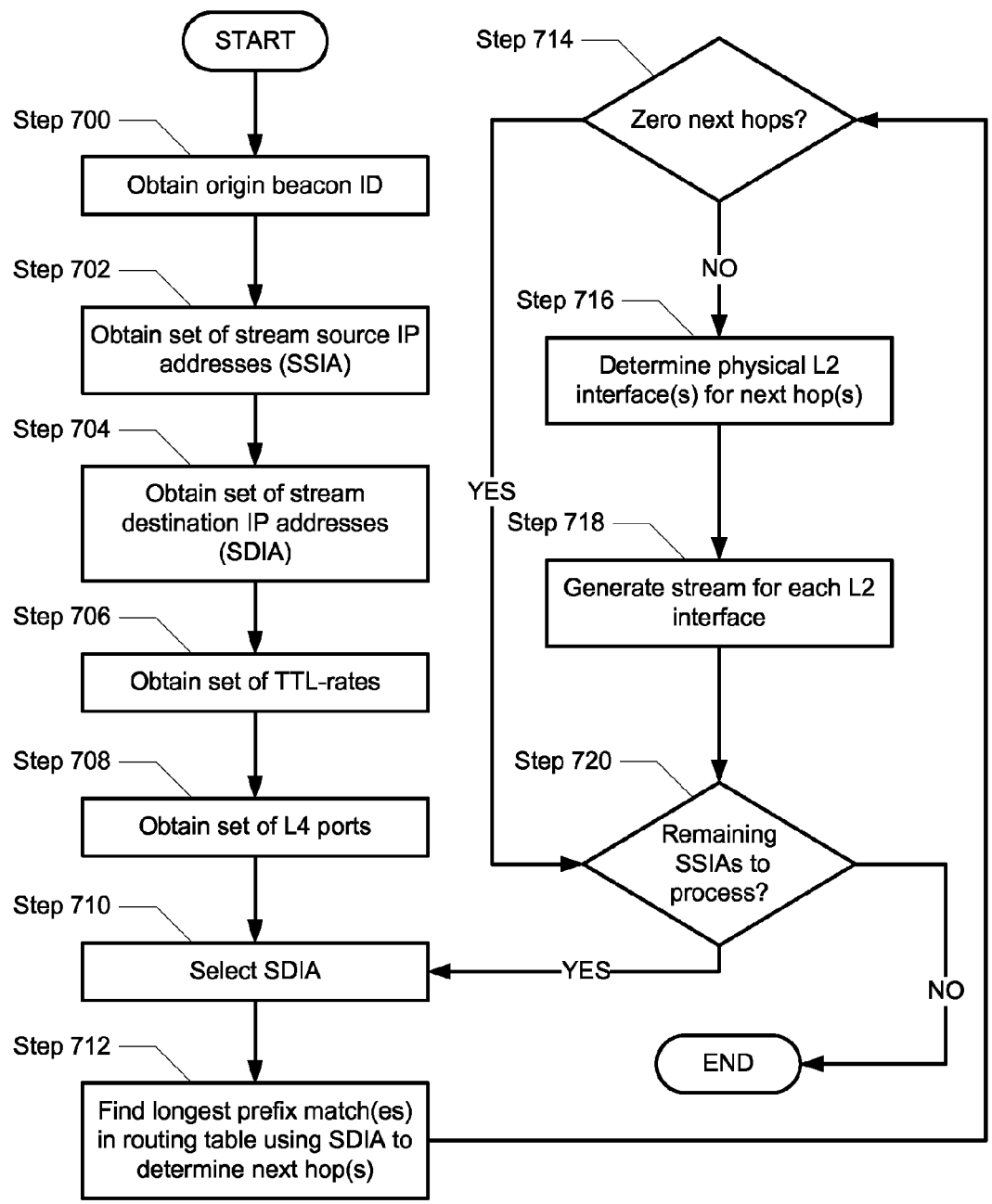
FIG. 7 shows a flowchart for creating streams in accordance with one or more embodiments of the invention.

FIG. 7 shows a flowchart for creating egress streams in accordance with one or more embodiments of the invention. In step 700, the origin beacon ID is obtained. As discussed above, the origin beacon ID may be a loopback address or any other identifier unique to the origin beacon.

In step 702, one or more stream source IP addresses (SSIAs) are obtained. In one embodiment of the invention, each of the SSIAs corresponds to a physical or virtual network interface that is currently being used to send packets on the network via the origin beacon (i.e., packets issued by the aforementioned network interfaces are routed through the origin beacon on their way to another network device in the network). As discussed above, the physical or virtual network interfaces corresponding to the stream source IP addresses may or may not correspond to physical or virtual network interfaces on the origin beacon (identified by the origin beacon ID identified in Step 700).

In step 704, one or more stream destination IP addresses (SDIAs) are obtained. In one embodiment of the invention, each of the SDIAs corresponds to a physical or virtual network interface that is currently being used to receive packets on the network transmitted from the origin beacon, where the packets may or may not originate from the origin beacon. Further, as discussed above, the physical or virtual network interfaces corresponding to the SDIA may or may not correspond to physical or virtual network interfaces on the termination beacon.

In step 706, a set of IP hops and forced-rates are obtained. In one embodiment of the invention, the IP hops are used to determine how many hops a particular probe packet may take once issued by the origin beacon. The IP hops are typically set to correspond to the number of hops required for the probe packet to reach a particular termination beacon. The forced-rates correspond to the rate at which the origin beacon should send out probe packets for a given stream. In some cases, the forced-rate may be set to 0 (or another default value) indicating that the origin beacon should calculate the rate at which probe packets for a given stream should be issued from the origin beacon, where the origin beacon may calculate the aforementioned rate based on the rate information in the EST. In one embodiment of the invention, the forced-rates may be derived from information obtained from one or more PRRs for the given stream.

In step 708, one or more L4 source ports are obtained. The L4 ports correspond to TCP or UDP ports. Because the stream is intended to mimic the packets sent by a given <source IP address, L4 source port> combination, the L4 source ports are selected, for example, (i) using random L4 source port selection, (ii) based on the actual L4 ports that are being used to transmit packets on the network, (iii) strided L4 source port selection, or (iv) source ports selecting in any other manner.

At this stage, the origin beacon (or a related process that handles stream creation) has sufficient information to create the streams. In step 710, a DSIA is selected from the set of DSIAs obtained in Step 704. In step 712, the longest prefix match(es) for the DSIA is obtained using the DSIA. The result of step 712 may return zero, one, or multiple matches (i.e., next hops). Multiple matches are typically obtained if packets are routed in the network using equal-cost multi-path routing (ECMP).

In step 714, a determination is made about whether there are zero next hops (i.e., there are no routes in the routing table of the network device on which the origin beacon is located) that match the DSIA. If there are zero next hops, no stream is created for the DSIA and the process proceeds to step 720; otherwise, the next hop is recorded and the process proceeds to step 716.

In step 716, for each of the next hops identified in step 714 one or more physical L2 interfaces are identified. In one or more embodiments of the invention, the physical L2 interfaces for a DSIA are determined as follows: (i) An ARP lookup is performed on the next-hop IP address(es) found in step 712. If the ARP lookup fails, there are no physical L2 interfaces for this DSIA and no streams are generated. If the ARP lookup succeeds, then resulting destination MAC address is stored the process continues to step (ii). (ii) for each next-hop determined in step 712, obtain the an associated L3 interface and continue to step (iii). (iii) if the L3 interface is a routed port or a single-port switch virtual interface, then the logical L2 interface is the same as the L3 interface; proceed to step (v). (iv) if the L3 interface is a switch virtual interface with multiple ports, then a MAC address table lookup is performed. If the MAC address table lookup fails, there are no physical L2 interfaces for this DSIA and no streams are generated. If the MAC table lookup succeeds, this results in one logical L2 interface; proceed to step (v). (v) if the logical L2 interface is an Ethernet interface, then this is also the physical L2 interface for this DSIA. If the logical L2 interface is a Link Aggregation Group (LAG), then the physical L2 interfaces for the DSIA are the set of physical interfaces that are members of the LAG.

In step 718, a stream is created for each of the physical L2 interfaces identified in step 716. More specifically, a stream is created for each combination of <SSIA, DSIA, source L4 port, L2 interface, IP Hop/TLL>, where the SSIA is selected from the set of SSIAs obtained in step 702, the DSIA is the DSIA selected in step 710, the source L4 port is selected from the set of source L4 ports obtained in step 708, and the L2 interface is selected from the L2 interfaces identified in step 716. In one embodiment of the invention, generating the streams includes creating the appropriate EST entries in the EST on the origin beacon. Further, each EST entry includes sufficient information to enable the generation of a probe packet for the stream. If not physical L2 interfaces are identified in step 716, then step 718 is not performed. In step 720, a determination is made about whether there are additional SSIAs to process. If so, the process proceeded to step 710; otherwise, the process ends.

Once a stream is created, the origin beacon may start generating probe packets for the stream at the rate specified (or otherwise calculated for the stream) and transmit the probe packets to/towards the appropriate termination beacons.

Figure 8:
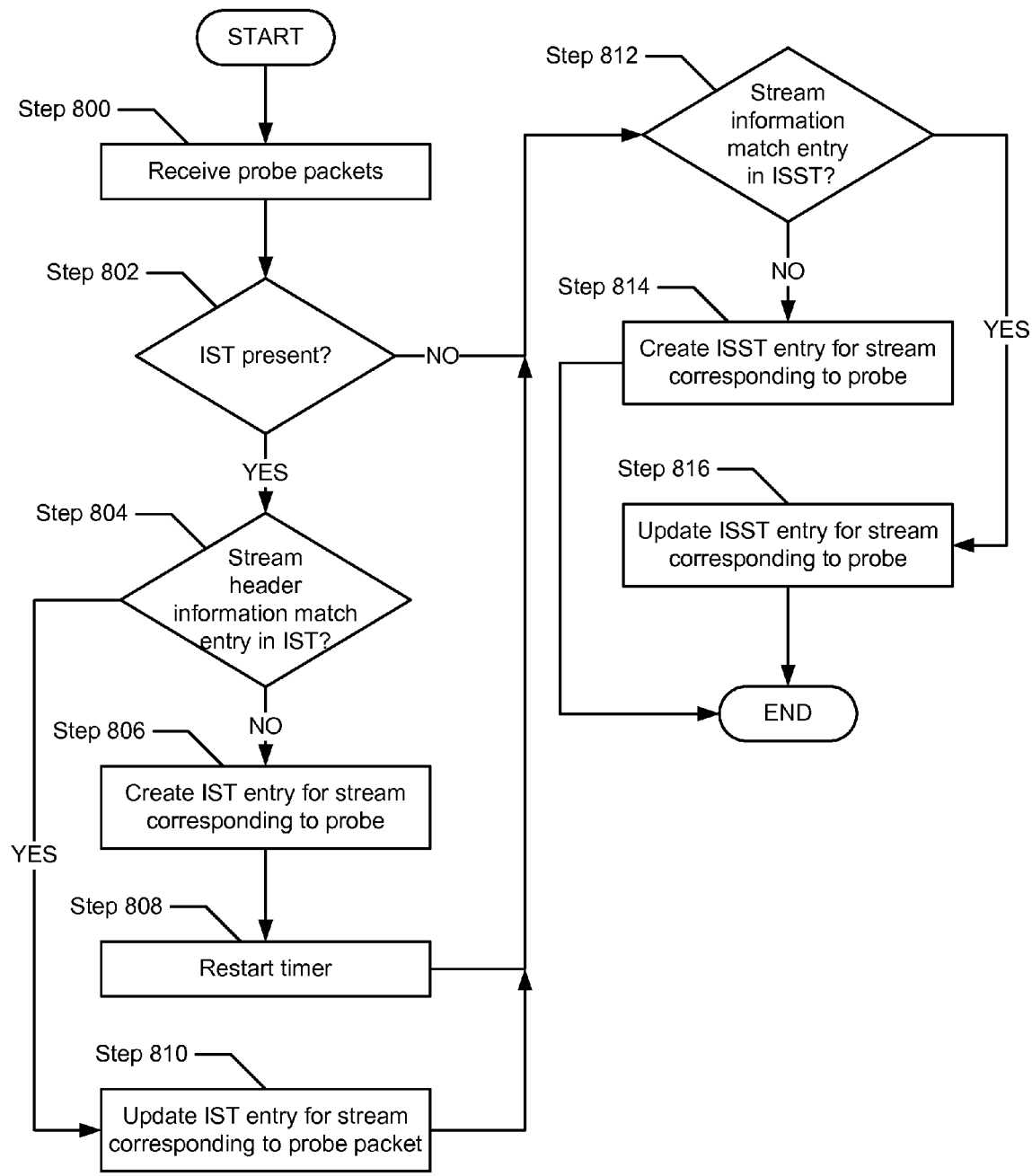
FIG. 8 shows a flowchart for processing a received probe packet in accordance with one or more embodiments of the invention.

FIG. 8 shows a flowchart for processing a received probe packets in accordance with one or more embodiments of the invention.

In step 800, a probe packet for a stream is received by the termination beacon. The origin beacon that generated and sent the probe packet does not receive any direct confirmation that the probe packet was received by the termination beacon; rather, the origin beacon may infer that the probe packet was received in the event that the origin beacon receives an RCP from the termination beacon that includes a PRR for the stream (i.e., the same stream with which the probe packet is associated).

In step 802, a determination is made about whether an IST is present in the termination beacon. The IST may only be present in termination beacons that implement dynamic rate computation (see FIG. 13). If the IST is present the process proceeds to Step 804; otherwise, the process proceeds to Step 812.

In step 804, a determination is made about whether the stream header information extracted from the probe packet matches stream header information for any IST entries. (see FIG. 6). If there is a match, then the process proceeds to step 810; otherwise, the process proceeds to Step 806. In step 806, an IST entry for the stream is created using information for the probe obtained in step 800 (See FIG. 6). In step 808, a timer (i.e., the probe rate request (PRR) refresh timer) associated with the IST is started with a duration equal to a new stream PRR period, which is the maximum period of time between the arrival of a probe packet for a new stream and the generation of the PRR for the new stream.

In one or more embodiments of the invention, the PRR refresh timer may have been started prior to step 808 and have a current value greater than the new stream PRR period. In such cases, the timer is restarted at the new stream PRR period. Alternatively, if the PRR refresh timer was started prior to step 808 and has a current value less than the new stream PRR period, then the timer is not started at the new stream PRR period; rather, the timer is allowed to continue from its current value. The PRR refresh timer may be restarted as a result of other probe packets arriving at the termination beacon.

If the IST entry already exists, then in step 810, the IST entry corresponding to the probe packet is updated using information from the probe packet (see FIG. 6). In step 812, a determination is made about whether the stream information extracted from the probe packet matches stream header information for any ISST entries (see FIG. 5). If there is a match, then the process proceeds to step 816; otherwise, the process proceeds to Step 814. In step 814, an ISST entry for the stream is created using information for the probe obtained in step 800 (See FIG. 5). If the ISST entry already exists, then in step 816, the ISST entry corresponding to the probe packet is updated using information from the probe packet (see FIG. 5).

Figure 9:
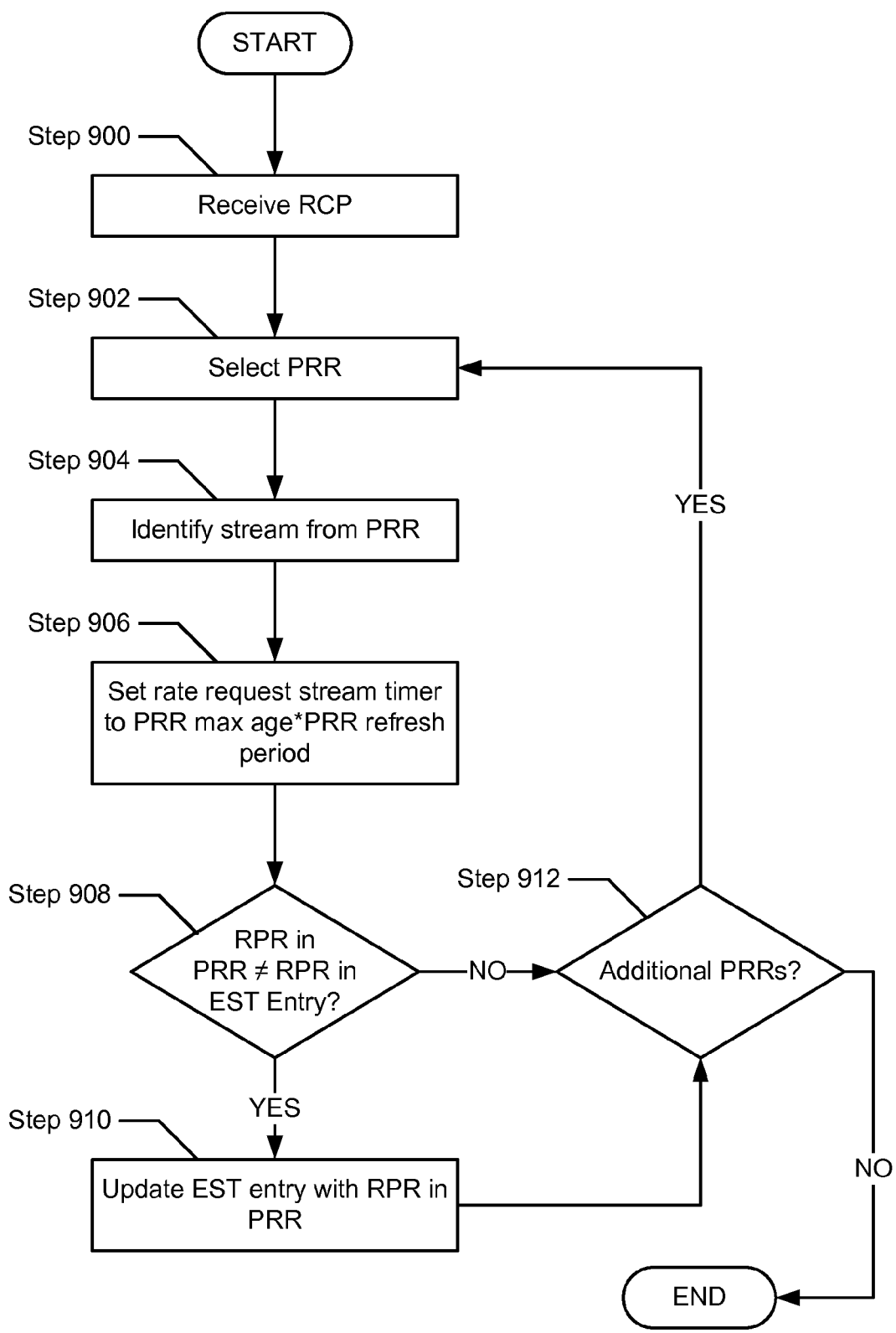
FIG. 9 shows a flowchart for processing a rate control packet in accordance with one or more embodiments of the invention.

FIG. 9 shows a flowchart for processing a rate control packet (RCP) in accordance with one or more embodiments of the invention.

In step 900, an RCP is received from a termination beacon in the network. In step 902, a PRR is extracted from the RCP. In step 904, the stream is identified from the contents of the PRR (see FIG. 3B). In step 906, a PRR expire timer for the stream (identified in step 904) is set to the PRR max age*PRR refresh period, wherein the PRR refresh period is greater than the egress rate recalculation period. If a PRR for a given stream is not received prior to the expiration of the PRR expire timer, then the rate at which probe packets are issued for a given stream reverts back to the default rate for the stream.

In step 908, a determination is made about whether the requested probe rate (RPR) in the PRR is equal to the RPR in the EST entry corresponding to the stream identified in Step 904. If the RPR in the PRR is equal to the RPR in the corresponding EST entry, the process proceeds to step 910; otherwise, the process proceeds to step 912. In step 910, the EST entry is updated with the RPR from the PRR. In step 912, a determination is made about whether there are additional PRRs to process. If so, the process proceeds to step 902; otherwise, the process ends.

FIGS. 10A and 10B show flowcharts for updating an EST in accordance with one or more embodiments of the invention.

Referring to FIG. 10A, FIG. 10A shows a flowchart for updating the EST with new streams. Specifically, new streams are added to the EST for an origin beacon when the egress stream recalculation timer expires. In this manner, the EST is not undergoing continuous changes; rather, the EST is updated periodically. In step 1000, a determination is made as to whether the egress stream recalculation timer has expired. If not, the process ends; otherwise, the process proceeds to Step 1002. In step 1002, the EST is updated to include new EST entries for any newly created streams (i.e., streams that have been created since the last update of the EST). In step 1004, one or more EST entries corresponding to existing streams may be removed from the EST if the existing streams are no longer valid because (i) the user has indicated that the stream is to be deleted or (ii) there are changes to networking tables (e.g., routing tables, MAC tables, etc.) in the origin beacon. In step 1006, the egress stream recalculation timer is restarted. The origin beacon may issue probe packets for any stream that has a corresponding entry in the EST. In one embodiment of the invention, the rate at which probe packets are issued by the origin beacon may be based, at least in part, on information in the EST entry.

Referring to FIG. 10B, FIG. 10B shows a flowchart for updating the EST entries with new assigned probe rates. Specifically, newly assigned probe rates are calculated when the egress rate recalculation timer expires. In this manner, the EST is not undergoing continuous changes; rather, the EST is updated periodically.

In step 1008, a determination is made as to whether the egress rate recalculation (ERR) timer has expired. If not, the process ends; otherwise, the process proceeds to Step 1010. In step 1010, the actual probe transmission interval (also referred to as the assigned probe rate) is calculated for each stream in EST (i.e., for each EST entry in EST). In one embodiment of the invention, the assigned probe rates are calculated using a scheme that satisfies at least the following criteria: (i) fair allocation to all streams (for which dynamic rate computation is enabled) that is proportional to the PRR from the corresponding termination beacon; (ii) avoidance of starvation situations if abnormally high PRRs are received; and (iii) the scheme must not cause the origin beacon to generate probe packets at such a high rate as to risk overwhelming the origin beacon's egress resources (i.e., exceeds to the origin beacon's ability to transmit probe packets). One example of such a scheme is referred to as a greedy probe rate assignment. The details about the greedy probe rate assignment scheme are described below. Other schemes may be used for calculating assigned probe rates without departing from the invention.

Figure 10:
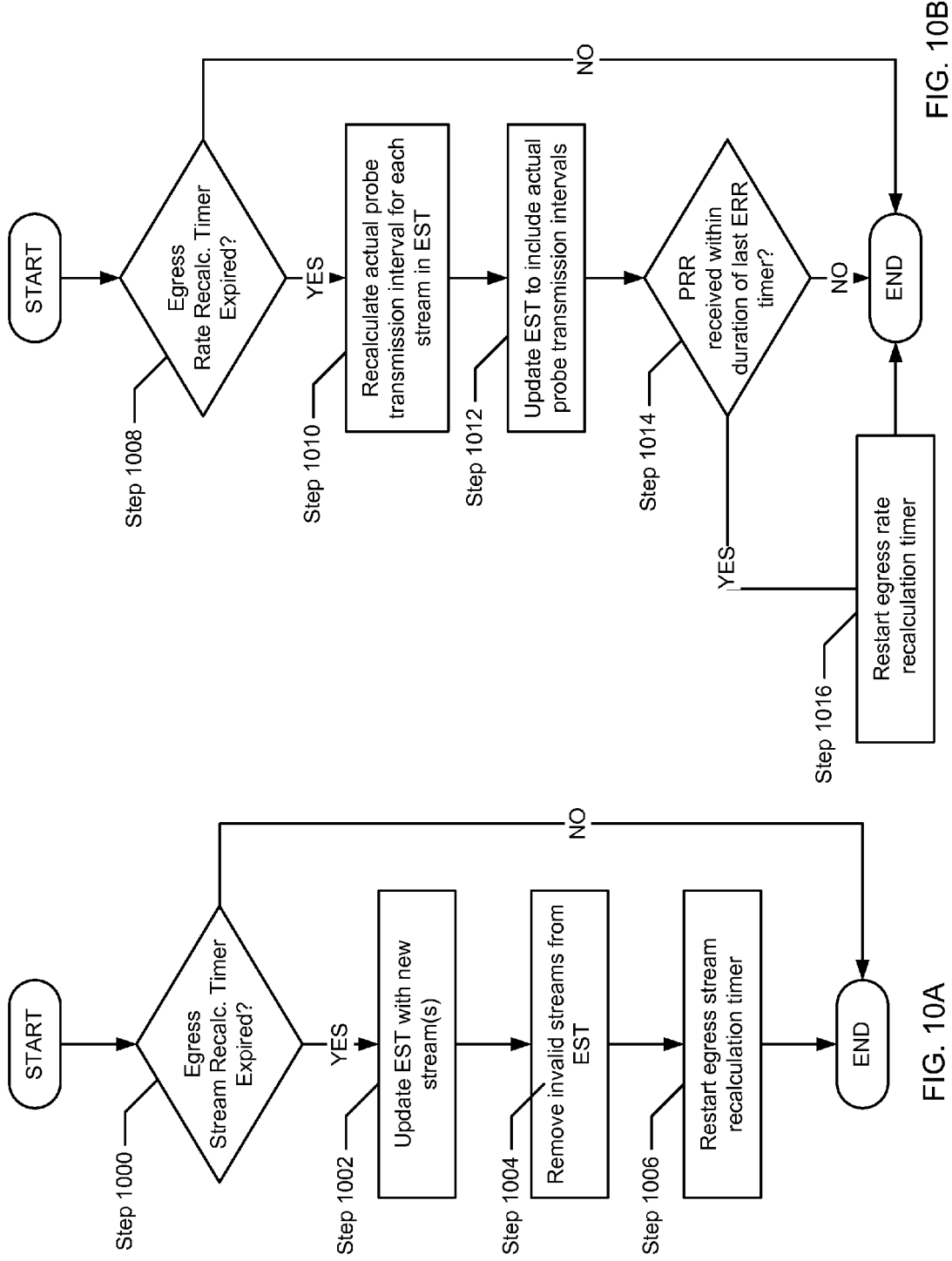
FIGS. 10A and 10B show flowcharts for updating an EST in accordance with one or more embodiments of the invention.

Continuing with the discussion of FIG. 10, in step 1012, the EST is updated to include the actual probe transmission intervals calculated in Step 1010. In step 1014, a determination is made about whether a PRR for any stream in the EST was received within the duration of the last ERR timer. If not, the process ends (i.e., origin beacon waits to receive a PRR after which the ERR timer may be restarted); otherwise, the process proceeds to Step 1016. In step 1016, the ERR timer is restarted.

Pseudo Code: Greedy Probe Rate Assignment Scheme

Input. Set of n stream requested probe rates $r_0...r_{n-1}$; maximum aggregate egress probe rate b.
Result. Actual stream probe rates $pr_0...pr_{n-1}$.
1. Sort the set of n requests $r_0...r_{n-1}$ where $r_0$ is the smallest request and $r_{n-1}$ is the largest request.
2. Set total probe allocation t = 0
3. Let $r_{-1} = 0$, s = 0, t=0
4. For request $r_i$ in $r_0...r_{n-1}$:
   a. If $(r_i - r_{i-1}) <= (b - t)/(n - i)$:
     If i > 0:
       $pr_{i-1} = s$
     $s += r_i - r_{i-1}$
     $t += (n - i)*(r_i - r_{i-1})$
   b. Else:
     If i > 0:
       $pr_{i-1} = s$
     $pr_i...pr_{n-1} = s + (b - t)/(n - i)$
     Return out of the loop.

The following is an example showing how the greedy probe rate assignment scheme may be used to assign probe rates. Turning to the example, consider the scenario in which the maximum aggregate egress probe rate is 1000 packets/second, the number of request is 7 and the requests are as follows: r[0]=10, r[1]=20, r[2]=30, r[3]=60, r[4]=100, r[5]=1,000, and r[6]=1,000. Using the greedy probe rate assignment scheme, the probe rates as assigned over 6 iterations. Table 1 shows the probe assigned at each iteration of the greedy probe assignment scheme and the total probes assigned to each request.

TABLE 1

Probe Rate Assignment

|  | Round 1: Probes provided during round: r[0] − r[−1] = 10 <=1000/7 | Round 2: Probes provided during round: r[1] − r[0] = 10 <=930/6 | Round 3: Probes provided during round: r[2] − r[1] = 10 <=870/5 | Round 4: Probes provided during round: r[3] − r[2] = 30 <=820/4 | Round 5: Probes provided during round: r[4] − r[3] = 40 <=700/3 | Round 6: Probes provided during round: r[5] − r[4] = 900 !<=580/2 | Final probe rate assignment (pr) |
| --- | --- | --- | --- | --- | --- | --- | --- |
| r[0] | 10 |  |  |  |  |  | 10 |
| r[1] | 10 | 10 |  |  |  |  | 20 |
| r[2] | 10 | 10 | 10 |  |  |  | 30 |
| r[3] | 10 | 10 | 10 | 30 |  |  | 60 |
| r[4] | 10 | 10 | 10 | 30 | 40 |  | 100 |
| r[5] | 10 | 10 | 10 | 30 | 40 | 290 | 390 |
| r[6] | 10 | 10 | 10 | 30 | 40 | 290 | 390 |

The following description provides detail about the greedy probe rate assignment scheme. This description is not intended to limit the scope of the invention. In the greedy probe rate assignment scheme, streams are assigned available probe bandwidth equally based on the PRR for the stream (r) until it is no longer possible to equally assign bandwidth to the remaining streams and stay below the maximum aggregate egress probe rate (b) (i.e., the rate at which the origin beacon can send the probes) for all streams in the origin beacon.

The following pseudo code shows one method for implementing the greed probe rate assignment scheme.

Figure 11:
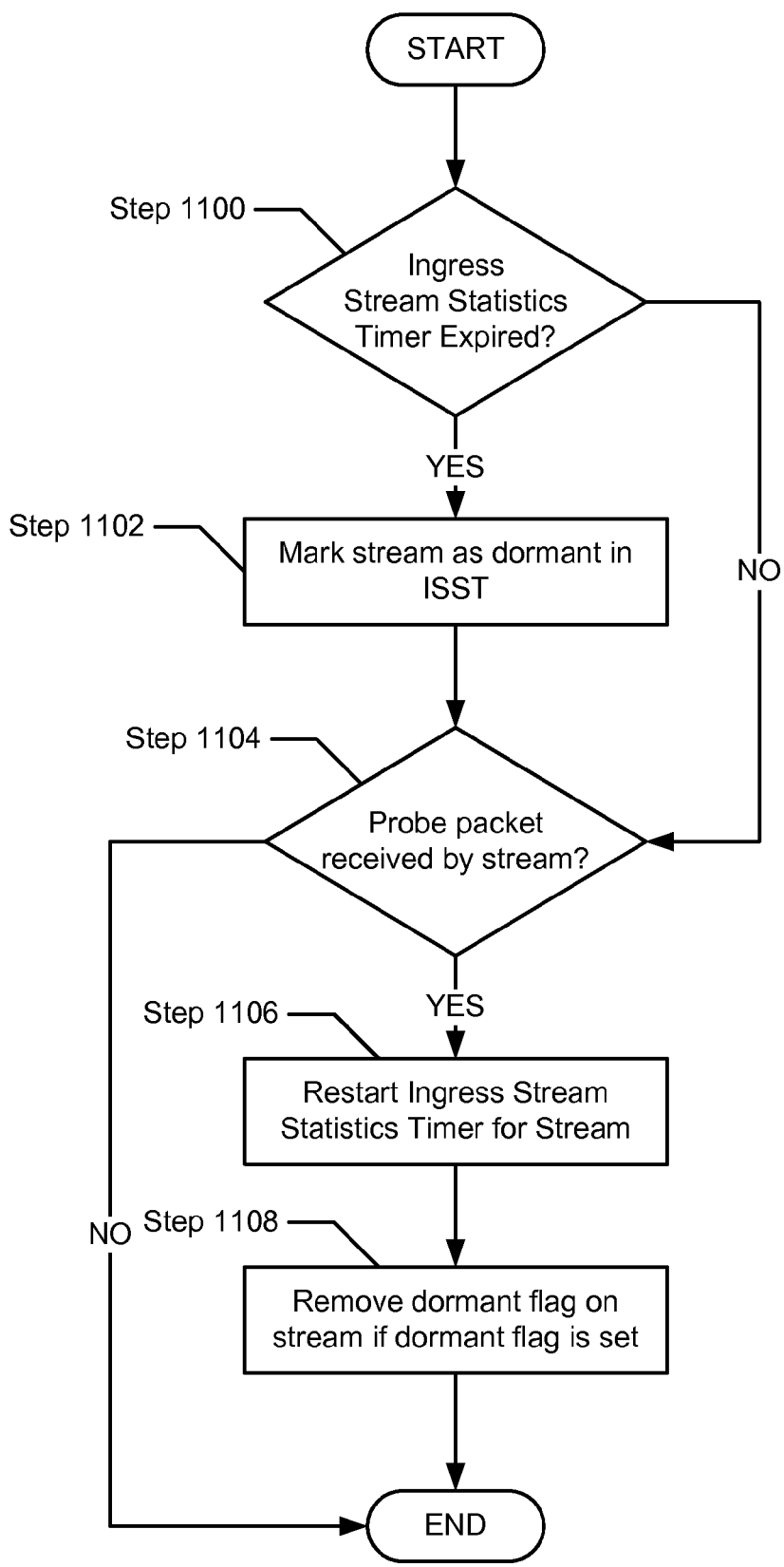
FIG. 11 shows a flowchart for updating an ISST in accordance with one or more embodiments of the invention.

Continuing with the discussion of the invention, FIG. 11 shows a flowchart for updating an ISST in accordance with one or more embodiments of the invention. More specifically, the process shown in FIG. 11 is used to ensure that only information about non-dormant streams is used to generate statistics related to the operation of the network.

In step 1100, a determination is made about whether the ISST timer for a given stream is expired. If not, the process proceeds to step 1104; otherwise, the process proceeds to Step 1102. The ISST timer for a stream is reset each time a probe packet is received from the stream. The duration of the ISST timer is set based on (i) the number of probe packets that are allowed to be lost (i.e., sent from the origin beacon but not received by the termination beacon) before the stream is removed from the ISST and (ii) the rate at which the origin beacon is issuing probe packets for the particular stream to the termination beacon. The duration of the ISST timer may be updated upon receipt of each probe packet for the stream.

In step 1102, the stream is marked as dormant in the ISST. When the stream is marked as dormant, the stream is not used to generate any statistics related to the operation of the network. Further, streams marked as dormant may be deleted from the ISST if the ingress checkpoint timer expires and the stream is still marked as dormant.

In step 1104, a determination is made about whether a probe packet is received from the stream. If not, the process ends and the stream remains marked as dormant (if it was previously marked as dormant); otherwise, the process proceeds to step 1106. In step 1106, the ISST timer for the stream is restarted and may, as discussed above, have a new duration. In step 1108, the dormant flag on the stream is removed if the stream was previously marked as dormant.

In one embodiment of the invention, the dormant flag is used to prevent the counters in the ISST from resetting when there is transient dormancy of a stream within a given checkpoint interval. By using the dormant flag the correct values in the appropriate checkpoint counter may be calculated within a given checkpoint period. The following example describes the use of the dormant flag. The example is not intended to limit the scope of the invention.

Figure 12:
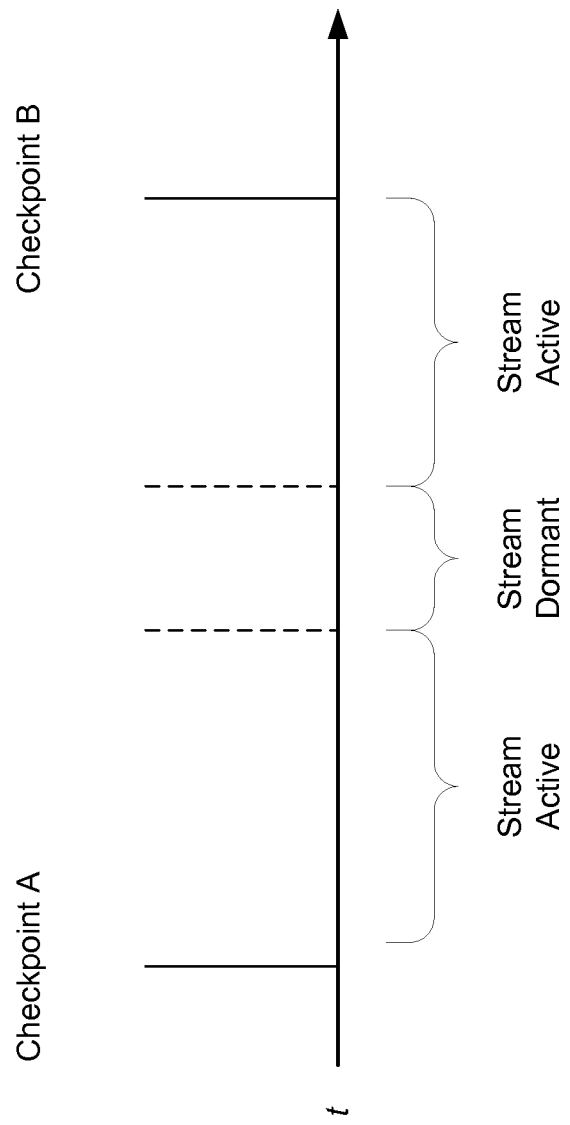
FIG. 12 shows an example of stream dormancy in accordance with one or more embodiments of the invention.

Referring to FIG. 12, FIG. 12 shows the state of a stream (as active or dormant) within a checkpoint interval. Specifically, at the start of the checkpoint interval (i.e., at checkpoint A) the stream is active. While the stream is active the checkpoint information (see FIG. 5, 504) is updated based on the received probes. At some point during the checkpoint interval (i.e., prior to checkpoint B), the stream goes dormant (as described in FIG. 11). While the stream is dormant, the checkpoint information for the stream is not updated. However, prior to reaching checkpoint B, the stream once again becomes active. As a result, the checkpoint information is updated for the steam based on the received probes. More specifically, the checkpoint information for the stream is not reset when the stream transitions from dormant to active within the checkpoint interval; rather, the checkpoint information is updated starting at the state of the checkpoint information prior to the stream becoming dormant. Accordingly, when checkpoint B is reached, the checkpoint information for the stream includes the cumulative information for the stream when the stream was active during the checkpoint interval. For example, if the stream received 100 probes between checkpoint A and the stream going dormant and 100 probes after the stream once again became active and prior to checkpoint B, the checkpoint information for the stream would indicate that 200 probes were received during the checkpoint interval.

Figure 13:
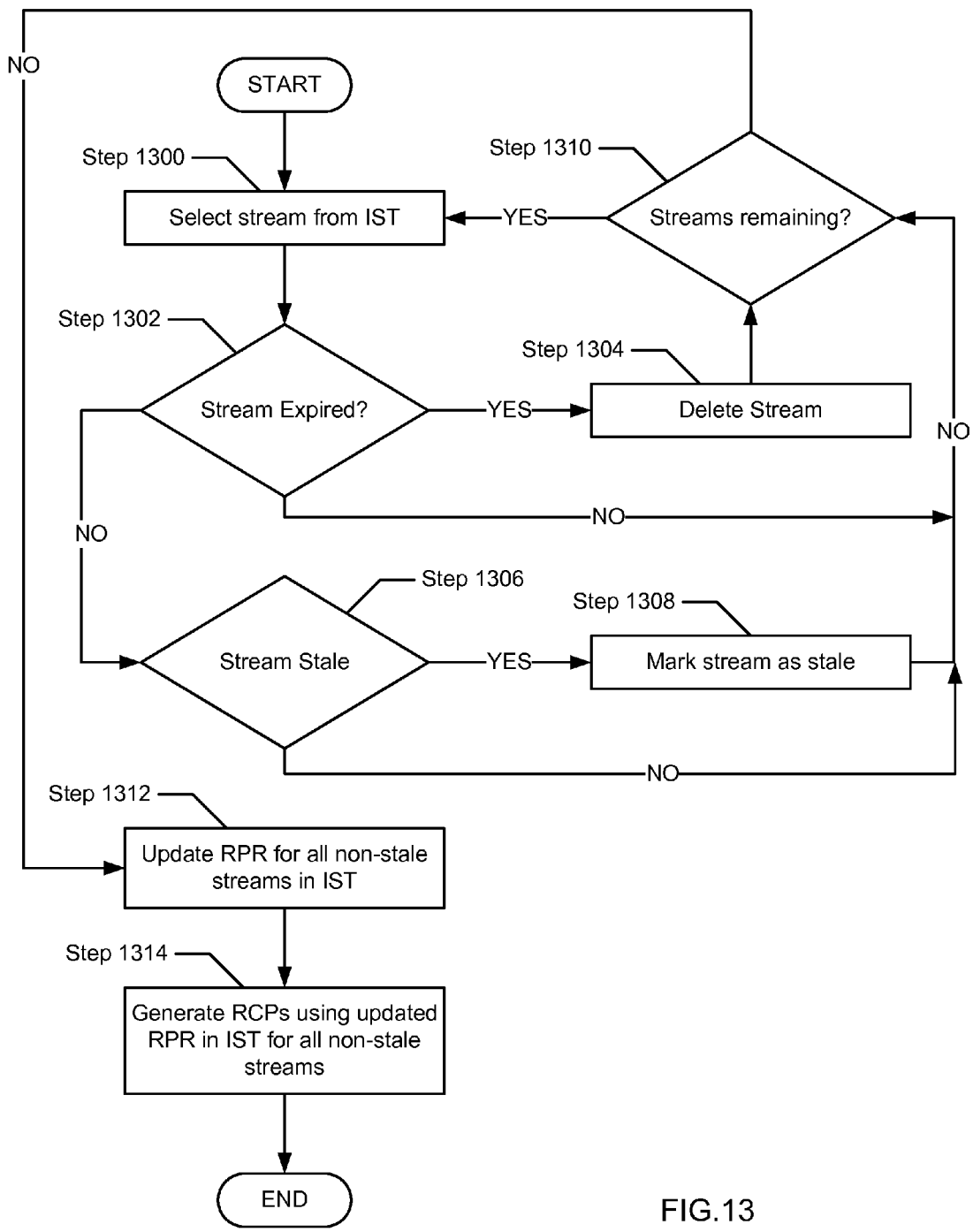
FIG. 13 shows a flowchart for updating an IST in accordance with one or more embodiments of the invention.

Continuing with the discussion of the invention, FIG. 13 shows a flowchart for updating an IST in accordance with one or more embodiments of the invention. More specifically, FIG. 13 shows a method for updating the IST after the expiration of the PRR refresh timer.

In step 1300, a stream is selected from the IST (i.e., an IST entry is selected). In step 1302, a determination is made about whether the stream has expired. A stream may be expired if no probe packets have been received for the stream for a duration greater than (PRR max age+1)*(PRR refresh period). If the stream is expired, then the process proceeds to step 1304; otherwise, the process proceeds to step 1306. In step 1304, the IST entry corresponding to the stream is deleted from the IST.

In step 1306, a determination is made about whether the stream is stale. A stream may be stale if no probe packets have been received for the stream for a duration greater than the PRR refresh period. If the stream is stale, then the process proceeds to step 1308; otherwise, the process proceeds to step 1310. In step 1308, the IST entry corresponding to the stream is marked as stale. When a probe packet for a stream currently marked as stale is received, the stream is no longer consider stale and, as such, is not longer marked as stale.

In step 1310, a determination is made about whether there are additional streams to process. If so, the process proceeds to Step 1300; otherwise, the process proceeds to Step 1312. In step 1312, the RPR is updated for all non-stale streams in the IST. The termination beacon may use any method for determining an RPR for each non-stale stream in the IST. In one embodiment of the invention, the rate information associated with stale streams may be used (along with rate information for the non-stale streams) to update the RPR for all non-stale streams. In step 1314, one or more RCPs are generated using the RPRs updated in step 1312. The RCPs are subsequently sent to the appropriate origin beacons.

Figure 14:
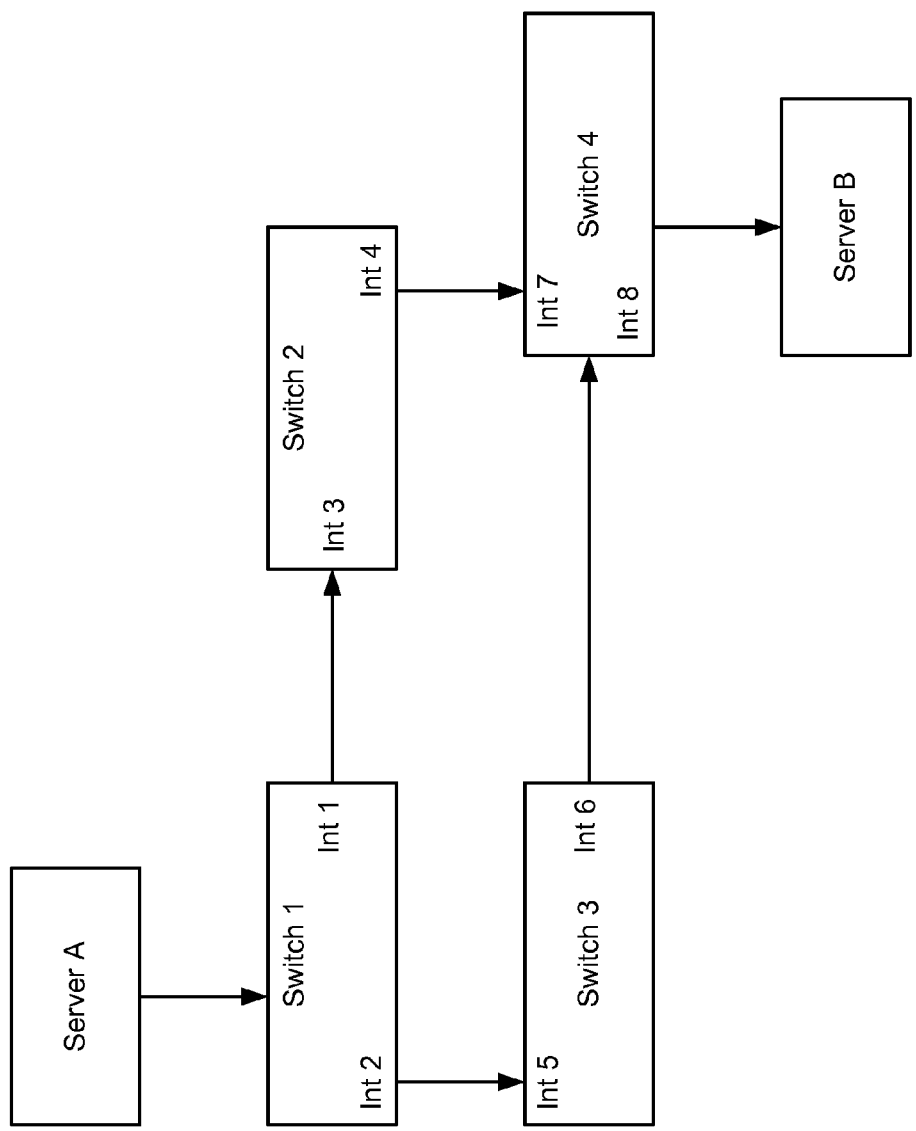
FIG. 14 shows an example in accordance with one or more embodiments of the invention.

FIG. 14 shows an example in accordance with one or more embodiments of the invention. The example is not intended to list the scope of the invention.

Turning to the example, consider a scenario in which packets sent from server A to server B are being dropped. In order to isolate the cause of the packet loss, the process executing on one or more switches in the network (or the administrator) initiates the following beacons on the following switches: (i) origin beacon on switch 1; (ii) origin beacon on switch 2, (iii) termination beacon on switch 2, (iv) origin beacon on switch 3, (v) termination beacon on switch 3, and (vi) a termination beacon on switch 4. In one embodiment of the invention, the termination beacons do not need to be explicitly initiated as described above; rather, the termination beacons may be running in the background during normal operation of the switches. Continuing with the example, in this example, if the switch is implementing both an origin beacon and a termination beacon, these beacons may be collectively referred to a beacon.

Returning to the example, six streams are created, where each of the streams includes the same stream source IP address (i.e., the IP address of server A), the same destination stream IP address (i.e., the IP address of server B), the same L4 source port, and the same L4 destination port. The following is a list of six streams that are created, where each entry in the list only shows value of the fields of the TLL (or IP Hops) and L2 interface for each of the streams.

TABLE 2

Streams

| Stream | Origin Beacon ID | IP Hops | L2 Origin Interface |
|---|---|---|---|
| 1 | Origin Beacon 1 on Switch 1 | 2 | Int 1 |
| 2 | Origin Beacon 1 on Switch 1 | 2 | Int 2 |
| 3 | Origin Beacon 1 on Switch 1 | 1 | Int 1 |
| 4 | Origin Beacon 1 on Switch 1 | 1 | Int 2 |
| 5 | Beacon 2 on Switch 2 | 1 | Int 4 |
| 6 | Beacon 3 on Switch 3 | 1 | Int 6 |

The probe packets for stream 1 are intended to originate at switch 1, pass through switch 2 and terminate at switch 4. The probe packets for stream 2 are intended to originate at switch 1, pass through switch 3 and terminate at switch 4. The probe packets for stream 3 are intended to originate at switch 1 and terminate at switch 2. The probe packets for stream 4 are intended to originate at switch 1 and terminate at switch 3. The probe packets for stream 5 are intended to originate at switch 2 and terminate at switch 4. The probe packets for stream 6 are intended to originate at switch 3 and terminate at switch 4.

Origin beacon 1 on switch 1 maintains an EST that includes streams 1-4. Beacon 2 on switch 2 maintains an EST that includes stream 5 and an IST and ISST that each include stream 3. Beacon 3 on switch 3 maintains an EST that includes stream 6 and an IST and ISST that includes stream 4. Termination beacon 4 on switch 4 maintains an IST and ISST that includes steams 1, 2, 5 and 6. The ESTs, ISTs, and ISSTs are updated in accordance with the methods described above with respect to FIGS. 7-13.

Finally, beacon 1 receives an RCP that includes PRRs for streams 1 and 2 from termination beacon 4, a second RCP that includes a PRR for stream 3 from beacon 2, and a third RCP that includes a PRR for stream 4 from beacon 3. Further, beacon 2 receives an RCP that includes a PRR for stream 5 and beacon 3 receives an RCP that includes a PRR for stream 6.

Using information from the respective IST and ISST on each of the aforementioned beacons, the administrator may ascertain the source of the problem that is causing packet loss between servers A and B in the network.

For example, consider that the ISST tables for termination beacons on switch 2, 3 and 4 are as follows:

TABLE 3

ISST for Termination Beacon on Switch 2

| Stream | Loss | Misordered | Received |
| --- | --- | --- | --- |
| 3 | 0 | 0 | 100 |

TABLE 4

ISST for Termination Beacon on Switch 3

| Stream | Loss | Misordered | Received |
| --- | --- | --- | --- |
| 4 | 0 | 0 | 100 |

TABLE 5

ISST for Termination Beacon on Switch 4

| Stream | Loss | Misordered | Received |
| --- | --- | --- | --- |
| 1 | 10 | 0 | 90 |
| 2 | 0 | 0 | 100 |
| 5 | 11 | 0 | 89 |
| 6 | 0 | 0 | 100 |

Based on the information shown in Tables 3-5, the network administrator determines that probe packets passing through switch 2, namely, probe packets for stream 1 and stream 5 are showing probe packet losses. As a result, the network administrator may ascertain that there is an issue related to switch 2's routing capabilities, switch 2's bridging capabilities, and/or to switch 2's interface (or link) to switch 4. Based on this information, the network administrator may proceed to further investigate the operation of switch 2 in order to address the packet lose identified above.

Those skilled in the art, having benefit of this disclosure, will appreciate that all timer values described above are configurable.

One or more embodiments of the invention may be implemented using instructions executed by one or more processors in the system. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by a processor perform a method, the method comprising:

receiving a probe packet by a termination beacon, wherein the probe packet is associated with a first stream of a plurality of streams, wherein the stream is identified using an origin beacon identification (ID) for an origin beacon, a stream source IP address, a stream destination IP address, an L2 origin interface, and one selected from a group consisting of an IP hops value and a time to live (TTL) value;

generating, after receiving the probe packet and after the expiration of a probe rate request (PRR) refresh timer, a rate control packet (RCP) by the termination beacon wherein the RCP comprises a PRR for the stream each of the plurality of streams and a second PRR for a second stream of the plurality of streams; and sending the RCP to the origin beacon using an origin beacon IP address, wherein the origin beacon IP address is different than the stream source IP address.

2. The non-transitory computer readable medium of claim 1, the method further comprising:

updating an egress stream table (EST) entry for the stream on the origin beacon with a requested probe rate specified in the PRR;

starting an egress rate recalculation timer on the origin beacon after updating the EST entry; and triggering recalculation of assigned probe rates for all streams in the EST after the egress rate recalculation timer expires.

3. The non-transitory computer readable medium of claim 2, the method further comprising:

updating the EST on the origin beacon after the expiration of an egress stream recalculation timer, wherein updating the EST comprises at least one selected from a group consisting of creating a new EST entry for a new stream and deleting an EST entry for an existing stream, wherein the egress stream recalculation timer has a longer duration than the egress rate recalculation timer.

4. The non-transitory computer readable medium of claim 1, the method further comprising:

updating, after receiving the probe packet, an ingress stream table (IST) entry for the stream to include a time the probe packet was received and a stream epoch for the stream included in the probe packet;

marking the stream as stale in the IST if another probe packet for the first Stream is not received by the termination beacon prior to the expiration of the PRR refresh timer; and deleting the IST entry for the stream when after the stream is marked as stale and another probe packet for the stream is not received by the termination beacon prior to the expiration of a time limit defined by (PRR max age+1)*duration of PRR refresh timer.

5. The non-transitory computer readable medium of claim 4, the method further comprising:
generating a plurality of PRRs wherein one PRR is generated for each non-stale stream in the IST, wherein the PRR is one of the plurality of PRRs, wherein the plurality of PRRs are transmitted to the origin beacon in the RCP, wherein the RCP comprises a termination beacon IP address.

6. The non-transitory computer readable medium of claim 1, the method further comprising:
updating, after receiving the probe packet, counter information and stream probes timing information in an ingress stream statistics table (ISST) entry for the first stream,
wherein the counter information comprises a number of probe packets received for the stream, a number of probe packets lost, and a number of probe packets misordered,
wherein the stream probes timing information comprises a time the probe packet was received, time when last probe packet was lost, and time when list probe packet was misordered;
marking the stream as dormant in the ISST if another probe packet for the stream is not received by the termination beacon prior to the expiration of the ingress stream statistics timer for the stream.

7. The non-transitory computer readable medium of claim 1, wherein the PRR specifies a requested rate at which the termination beacon wants to receive probe packets for the stream from the origin beacon.

8. The non-transitory computer readable medium of claim 1, the method further comprising:
determining, by the origin beacon, an assigned probe rate for the stream based on the requested rate and an effective egress probe rate for the origin beacon,
wherein the effective egress probe rate specifies a maximum number of total probe packets the origin beacon will generate per time unit for all streams specified on the origin beacon.

9. The non-transitory computer readable medium of claim 8, wherein the assigned probe rate for the stream is less than the requested rate.

10. The non-transitory computer readable medium of claim 8, wherein the assigned probe rate for the stream is greater than the requested rate.

11. The non-transitory computer readable medium of claim 8, wherein the assigned probe rate for the stream is determined using a greedy probe rate assignment in which the origin beacon assigns probe rates to all of the streams equally based on a requested probe rate for each of the streams until it is no longer possible to equally assign probe rates while staying below the maximum number of total probe packets.

12. The non-transitory computer readable medium of claim 1, wherein the stream is further identified using at least one selected from a group consisting of an L4 source port, an L4 destination port, a L4 protocol, source Media Access Control (MAC) address, a destination MAC address, and a Virtual Local Area Network (VLAN) tag.

13. The non-transitory computer readable medium of claim 1, wherein the origin beacon is a switch.

14. The non-transitory computer readable medium of claim 1, wherein the termination beacon is a switch.

15. The non-transitory computer readable medium of claim 1, wherein the L2 origin interface specifies a physical interface on which the origin beacon executers and from which the probe packet is received.

16. A non-transitory computer readable medium comprising instructions, which when executed by a processor perform a method, the method comprising:
generating a probe packet for a stream of a plurality of streams specified in an egress stream table (EST) in an origin beacon, wherein the stream is identified using an origin beacon identification (ID), a stream source IP address, a stream destination IP address, an L2 origin interface, and one selected from a group consisting of an IP hops value and a time to live (TTL) value;
transmitting the probe packet from the origin beacon to a termination beacon, wherein the probe packet is transmitted using the L2 origin interface; and
receiving, a rate control packet (RCP) from the termination beacon, wherein the RCP comprises a packet rate request (PRR) for the first stream of the plurality of streams and a second PRR for a second stream of the plurality of streams.

17. The non-transitory computer readable medium of claim 16, the method further comprising:
receiving a second probe packet by the origin beacon, wherein the second probe packet is associated with a second stream;
generating, after receiving the second probe packet and after the expiration of a probe rate request (PRR) refresh timer, a second RCP by the origin beacon wherein the second RCP comprises a PRR for the second stream; and
sending the rate control packet to a second origin beacon using an origin beacon IP address of the second beacon.

18. The non-transitory computer readable medium of claim 16, the method further comprising:
generating a stream from stream family information comprising the origin beacon ID, a plurality of stream source IP addresses, a plurality of stream destination IP addresses, a plurality of L4 source ports, a plurality of L4 destination ports, and a plurality of IP hop values;
wherein the stream is associated with stream information comprising the origin beacon ID, one of the plurality of stream source IP addresses, one of the plurality of stream destination IP addresses, one of the plurality of L4 source ports, one of the plurality of L4 destination ports, one of the plurality of IP hop values, and the L2 origin interface determined using the one of the plurality of stream destination IP addresses,
wherein the probe is generated using the stream information.

19. The non-transitory computer readable medium of claim 16, wherein a plurality of probe packets are generated using the one of the plurality of destination IP addresses, wherein the probe packet is one of the plurality of probe packets, and wherein each of the plurality of probe packets is associated with a different L2 origin interface on the origin beacon.

20. The non-transitory computer readable medium of claim 16, wherein the probe packet specifies a default destination L4 port and wherein the RCP specifies a second default destination port, wherein the origin beacon is one of a plurality of beacons, wherein the termination beacon is one of the plurality of beacons, wherein probe packets generated by all of the plurality of beacons use the default destination L4 port, and wherein RCPs generated by all of the plurality of beacons use the second default destination L4 port.

21. The non-transitory computer readable medium of claim 16, Wherein the L2 origin interface specfies a physical interface on which the origin beacon Executes and from which the probe packet is transmitted.

* * * * *